(12) United States Patent
Kröll et al.

(10) Patent No.: US 10,378,162 B2
(45) Date of Patent: Aug. 13, 2019

(54) AUTOMOTIVE CONSTRUCTION MACHINE AND METHOD FOR DISPLAYING THE SURROUNDINGS OF AN AUTOMOTIVE CONSTRUCTION MACHINE

(71) Applicant: Wirtgen GmbH, Windhagen (DE)

(72) Inventors: Harald Kröll, Unkel (DE); Herbert Lange, Overath (DE); Martin Lenz, Grossmaischeid (DE)

(73) Assignee: Wirtgen GmbH (DE)

( * ) Notice: Subject to any disclaimer, the term of this patent is extended or adjusted under 35 U.S.C. 154(b) by 354 days.

(21) Appl. No.: 15/219,597

(22) Filed: Jul. 26, 2016

(65) Prior Publication Data

US 2017/0037586 A1 Feb. 9, 2017

(30) Foreign Application Priority Data

Aug. 5, 2015 (DE) .................... 10 2015 010 009

(51) Int. Cl.
*E01C 23/088* (2006.01)
*B62D 55/116* (2006.01)
(Continued)

(52) U.S. Cl.
CPC .............. *E01C 23/088* (2013.01); *B60R 1/00* (2013.01); *B62D 55/116* (2013.01);
(Continued)

(58) Field of Classification Search
CPC ......... E01C 23/12; E01C 23/08; E01C 23/088
(Continued)

(56) References Cited

U.S. PATENT DOCUMENTS 8,590,983 B2 * 11/2013 Berning ............. B62D 33/0636
299/39.4
9,181,664 B2 11/2015 Berning et al.
(Continued)

FOREIGN PATENT DOCUMENTS

DE 102006003538 B3 7/2007
DE 202007005756 U1 8/2008
(Continued)

OTHER PUBLICATIONS

Office action dated Jan. 18, 2018 in co-pending U.S. Appl. No. 15/219,620, filed Jul. 26, 2016 to Kröll et al., 31 pp. (not prior art).
(Continued)

*Primary Examiner* — Sunil Singh
(74) *Attorney, Agent, or Firm* — Lucian Wayne Beavers; Gary L. Montle; Patterson Intellectual Property Law, PC

(57) ABSTRACT

The invention relates to an automotive construction machine, in particular a road milling machine, recycler or surface miner, and to a method for displaying an image of the surroundings of an automotive construction machine. The construction machine according to the invention has an image display device for displaying a bird's eye view image of the surroundings of the construction machine, which image display device has a camera system with a plurality of cameras provided on the machine frame for recording individual overlapping image regions of the construction machine surroundings from different image recording positions, and an image processing system. The image processing system is configured in such a way that image details of the individual image regions are joined together to form a total image from a bird's eye view. For this purpose, the construction machine has a position detection device, which detects the height and/or the incline of the machine frame in relation to the ground surface and cooperates with the position detection device in such a way that when the image (Continued)

details of the individual image regions are joined together to form a total image from a bird's eye view, the course of the stitching which is located between the image details and within the overlapping regions of the image regions is determined depending on the height and/or the incline of the machine frame in relation to the ground surface.

33 Claims, 12 Drawing Sheets

(51) Int. Cl.

| | | |
|---|---|---|
| *E02F 9/02* | (2006.01) | |
| *E02F 9/26* | (2006.01) | |
| *B60R 1/00* | (2006.01) | |
| *E01C 23/12* | (2006.01) | |
| *H04N 5/265* | (2006.01) | |
| *H04N 7/18* | (2006.01) | |

(52) U.S. Cl.
CPC ............ *E01C 23/127* (2013.01); *E02F 9/024* (2013.01); *E02F 9/028* (2013.01); *E02F 9/261* (2013.01); *H04N 5/265* (2013.01); *H04N 7/181* (2013.01); *B60R 2300/105* (2013.01); *B60R 2300/303* (2013.01); *B60R 2300/607* (2013.01); *E01C 2301/00* (2013.01)

(58) Field of Classification Search
USPC .................. 404/90–94; 299/36.1, 39.1, 39.4
See application file for complete search history.

(56) References Cited

U.S. PATENT DOCUMENTS

| | | |
|---|---|---|
| 2008/0143835 A1 | 6/2008 | Abe et al. |
| 2008/0309784 A1 | 12/2008 | Asari et al. |
| 2009/0022423 A1 | 1/2009 | Ehlgen et al. |
| 2012/0127310 A1 | 5/2012 | Kim |
| 2014/0247352 A1* | 9/2014 | Rathi .................. B60R 1/00 348/148 |
| 2014/0267731 A1 | 9/2014 | Izumikawa |
| 2015/0009329 A1* | 1/2015 | Ishimoto .............. B60R 1/00 348/148 |
| 2015/0070498 A1 | 3/2015 | Kriel |
| 2015/0368881 A1 | 12/2015 | Baeumchen |

FOREIGN PATENT DOCUMENTS

| | | |
|---|---|---|
| DE | 102011077143 A1 | 12/2012 |
| DE | 102011088332 A1 | 6/2013 |
| DE | 102013006464 A1 | 10/2013 |
| DE | 102013002079 A1 | 8/2014 |
| DE | 102014013155 A1 | 3/2015 |
| JP | 2010241548 A | 10/2010 |
| JP | 2013253402 A | 12/2013 |

OTHER PUBLICATIONS

Co-pending U.S. Appl. No. 15/219,620, filed Jul. 26, 2016 to Kröll et al. (not prior art).
German Patent and Trademark Office, First Office Action in corresponding German Patent Application No. DE102015010009.2 dated Jun. 22, 2016, 6 pp. (not prior art).
European Search Report in corresponding European Patent Application No. EP 16180881.1, dated Jan. 23, 2017, 7 pp. (not prior art).
European Search Report in European Patent Application No. EP 16180895.1 corresponding to co-pending U.S. Appl. No. 15/219,620, dated Jan. 19, 2017, 8 pp. (not prior art).

* cited by examiner

AUTOMOTIVE CONSTRUCTION MACHINE AND METHOD FOR DISPLAYING THE SURROUNDINGS OF AN AUTOMOTIVE CONSTRUCTION MACHINE

BACKGROUND OF THE INVENTION

1. Field of the Invention

The invention relates to an automotive construction machine, in particular a road milling machine, stabiliser, recycler or surface miner, which has an image display device for displaying an image of the surroundings of the construction machine. Moreover, the invention relates to a method for displaying an image of the surroundings of an automotive construction machine.

2. Description of the Prior Art

The known construction machines have a machine frame, which is carried by a chassis that has front and rear running gears, and a working device arranged on the machine frame for working the ground, for example for removing defective road layers (road milling machine), preparing the ground for road construction or recycling existing road surfaces (stabiliser, recycler) or mining mineral resources (surface miner). The working device may have a milling and/or cutting roller. Lifting devices, which can in each case be retracted or extended, are associated with the individual running gears of the construction machine so that the machine frame can be lowered or raised together with the working device in relation to the ground surface or can be orientated with respect to its incline to the ground surface.

While a construction machine is being used, the height and orientation of the machine frame in relation to the ground surface may change. To work the ground, the machine frame can be lowered so that the working roller of the working device is in contact with the ground, while to move or transport the construction machine, the machine frame can be raised so that the working roller is arranged at an adequate spacing from the ground. In the case of the known construction machines, the machine frame can also be strongly inclined forward or rearward and/or to the side.

The operator of the machine is confronted with the problem that the surroundings of the construction machine can only be seen to a limited extent from the control stand. There is the added difficulty, for example, in the case of road milling machines that the machine operator's view is also limited by the transport device which protrudes a long way and extends forward in the working direction in the case of front loader road milling machines and extends rearward in the case of rear loader road milling machines. Consequently, the driver of a road milling machine cannot see from the control stand objects that are concealed by the transport device in the field of vision of the machine operator. Depending on the position of the driver on the control stand extending over the entire width of the machine and the large pivoting angle and angle of inclination of the transport device, not only may objects located below the transport device be concealed, but also those next to or in front of the transport device.

Because of the limited view, construction machines are known that are equipped with one or more cameras. Known road milling machines have, for example, a camera which records an image of a rearward region of the construction machine, which is displayed on a display unit arranged on the control stand. This makes it easier for the machine operator to reverse the milling machine.

DE 10 2013 002 079 A1 (US 2015/368881) describes a digger, which has a plurality of monitoring cameras, which are arranged on different sides of the machine frame at different heights above the ground surface. The individual cameras, which may be displaceably or rotatably mounted on the machine frame for adjustment, record partial images of the surroundings, said images being joined together by means of image processing to form a total image of a specific region of the surroundings.

Devices which assist the driver when parking the vehicle are known for motor vehicles, in particular passenger vehicles. Devices of this type are also called driver assistance systems and supply the driver of the motor vehicle with a complete image of the vehicle surroundings from a virtual point of view which is located above the vehicle. A surround view of this type of the surroundings is also called a bird's eye view.

DE 10 2011 077 143 A1 describes a driver assistance system for motor vehicles, which has a front camera in the radiator grille, a side camera in each of the two outside mirrors and a rear camera on the vehicle rear in the region of the grip recess of the boot lid. The front camera records a front image region and the rear camera records a rear image region, while the side cameras record lateral image regions, which are transformed using a suitable imaging model into a total image composed of four image details. Complete coverage of the entire vehicle surroundings is to be achieved in that the cameras are equipped with an optical system allowing a horizontal opening angle of more than 180° (fish-eye optical system), so that the individual image regions overlap one another.

DE 10 2011 088 332 A1 describes a method for improving object detection in multi-camera systems for motor vehicles. The document deals with the problem of detecting raised objects in critical regions of a total image from a bird's eye view. The method provides the recording of a front and rear and two lateral viewing regions, which are joined together to form a total image from a bird's eye view. The critical regions for the object detection are to be located in the region of the stitching. While in current systems a rigidly implemented and non-changeable stitching is defined within the overlapping region of the images, the known method provides a displacement of the stitching in such a way that the stitching is not located in the region of raised objects. This is to avoid objects being located in the region of the stitching which is critical for object detection.

A method for joining together a plurality of image recordings to form a total image from a bird's eye view is also known from DE 10 2006 003 538 B3. Apart from use in passenger vehicles, the known method is also suitable for use in lorries, omnibuses or construction vehicles.

DE 2014 013 155 A1 describes an image display system for movable working machines such as lorries for transporting earth, wheel bearings or diggers, which allows objects located in the limited field of vision of the vehicle driver to be seen. The image display system also provides a bird's eye view. The type of view depends on a specific state of the working machine, which is detected by sensors. In a preferred embodiment, the movement direction and speed of the working machine are detected as the state of the working machine in order to be able to monitor the spatial relationship between machine and object. For example, an object is not to be indicated if it is located outside the movement region of the machine.

Although occasional references in the documentary prior art can be found to the use of the known driver assistance system even in construction machines, the known driver assistance systems preferably intended for passenger vehicles or lorries are generally not suitable for the particular requirements, which automotive construction machines with a machine frame that can be adjusted with respect to height and/or incline, in particular a road milling machine, stabiliser, recycler and surface miner, demand of driver assistance systems, as these construction machines and motor vehicles fundamentally differ from one another in that a motor vehicle does not have a working device arranged on a machine frame, the height and/or incline of which can be changed in relation to the ground surface.

SUMMARY OF THE INVENTION

The object of the invention is to provide an automotive construction machine with a machine frame that can be adjusted with respect to height and/or incline, in particular a road milling machine, stabiliser, recycler and surface miner, which provides the machine operator with a high degree of operating convenience. A further object of the invention is to specify a method for improving the operating convenience.

These objects are achieved by the features of the independent claims. The dependent claims relate to advantageous embodiments of the invention.

The construction machine according to the invention has an image display device for displaying a bird's eye view image of the surroundings of the construction machine, which image display device has a camera system with a plurality of cameras provided on the machine frame for recording individual overlapping image regions of the construction machine surroundings from different image recording positions, and an image processing system. The image processing system is configured in such a way that image details of the individual image regions are joined together to form a total image from a bird's eye view. For this purpose, the construction machine has a position detection device detecting the height and/or the incline of the machine frame in relation to the ground surface. The incline of the machine frame in relation to the ground surface is to be distinguished from the incline in relation to the horizontal. It is unimportant for the invention how the position of the machine frame in relation to the ground surface is detected. Therefore all known devices and methods for position detection may be used.

The construction machine according to the invention is distinguished in that the image processing system cooperates with the position detection device in such a way that when the image details of the individual image regions are joined together to form a total image from a bird's eye view, the course of the stitching located between the image details, which is located within the overlapping regions of the image regions, is determined depending on the height and/or the inclination of the machine frame in relation to the ground surface. The incline of the machine frame may be an incline in relation to the ground surface in a direction transverse to the working direction of the construction machine and/or in the longitudinal direction of the construction machine. Consequently, the construction machine does not provide the definition of rigidly implemented and non-changeable stitching within the overlapping regions of the image regions, but can optimally adapt the cutting of the image details to the position of the machine frame in relation to the ground. A complete and clear surround view is even ensured for the machine operator when the construction machine is strongly inclined forward or rearward and/or to the side. Changing the height of the machine frame in relation to the ground surface is also taken into account in the display of the surroundings of the construction machine. Determining the course of the stitching depending on the height and/or the incline of the machine frame allows the individual images to be joined together relatively easily with a comparatively low computational complexity, so the image data required to display the total image can be generated in real time. Compensating the height and/or incline of the machine frame also has the advantage that objects in the region of the stitching, which are possibly reproduced double or not at all due to imaging errors, can be better detected.

The position detection device is preferably configured in such a way that height data describing the height of the machine frame in relation to the ground surface and/or transverse incline data describing the incline of the machine frame in relation to the ground surface in a direction transverse to the working direction of the construction machine and/or longitudinal incline data describing the incline of the machine frame in relation to the ground surface in the longitudinal direction of the construction machine are produced.

In this context, a transverse incline is taken to mean a rotary movement about the longitudinal axis of the construction machine and a longitudinal incline is taken to mean a rotary movement about the transverse axis of the construction machine. The rotary movement about the longitudinal axis is also called rolling and the rotary movement about the transverse axis is called pitching of the construction machine.

The height data and incline data can be obtained from the lifting position of the lifting devices associated with the individual running gears. Sensors, for example cable sensors, may be provided to detect the lifting position of the individual lifting devices. The position of the machine frame in relation to the ground may, however, also be determined using distance sensors, for example infrared or ultrasonic distance sensors. It is also possible to detect the position of an edge protector and/or hold-down device and/or stripper device of a construction machine for position determination.

When the position of the machine frame is changed, the viewing angles of the cameras arranged on the machine frame are changed, so that the image regions of the surroundings recorded by the cameras change. A change in the height or incline of the machine frame leads to an increase or reduction in the image region recorded, in which case the contours of the image region are displaced.

The image processing system is preferably configured in such a way that the contours of the individual image regions of the camera are determined based on the height data and/or transverse incline data and/or longitudinal incline data, and the overlapping regions of the image regions are determined based on the contours. Different overlapping regions are produced depending on the height and/or incline of the machine frame. The spatial position and extent of the overlapping regions determine the dimensions of the image details to be selected that are joined together to form a total image from a bird's eye view. As a result, the course of the stitching between the image details is also determined.

The image processing system is configured in such a way that the course of the stitching between the image details is determined depending on the height and/or incline of the machine frame in such a way that a complete and clear surround image of the construction machine surroundings is displayed. The stitching may, however, be differently arranged within the overlapping regions. Depending on the arrangement of the stitching within the overlapping regions, different views of the surroundings may be produced. For example, the view to one side of the machine frame can be extended at the cost of the view forward or rearward. In this regard, optimal specifications can be made by the image processing system under certain criteria.

A preferred embodiment provides that the image processing system is configured in such a way that image details of the individual image regions are joined together to form a rectangular total image from a bird's eye view. This view proves to be particularly clear to the machine operator as construction machines generally also have a rectangular contour. However, a non-rectangular view of the surroundings is also possible. In particular when using cameras having lenses with particularly small focal lengths and a particularly large recording angle (fish-eye lenses), a total image from a bird's eye view that is at least partially limited by round contours may be advantageous.

In a further embodiment, the image processing system is configured in such a way that a symmetrical detail of the total view in relation to the longitudinal sides and/or transverse sides of the machine frame is displayed from a bird's eye view. This prevents the view of the surroundings changing with the position of the machine frame. For this view, a symmetrical detail in relation to the machine frame is selected from the total image in that the surroundings of the construction machine are displayed completely and clearly taking into account the maximum possible position changes of the machine frame or those to be expected.

The image display device preferably has an input unit, with which different display modes can be selected by the machine operator. If the machine operator would, for example, like to have a particularly wide surround view, he can select a non-symmetrical display mode, or a symmetrical view with a smaller detail at the cost of the extended surround view.

The cameras may be arranged on the machine frame basically at different points. It would be advantageous if the viewing direction of the cameras in an orientation of the machine frame parallel to the surface of the ground is orthogonal to the ground surface. For this purpose, the camera would have to be arranged on a jib of the machine frame with the viewing direction onto the ground. Otherwise, the orientation of the camera even with a parallel orientation of the machine frame is sloping to the ground.

A sloping position of the camera axes to the ground surface inevitably leads to distortions when displaying the camera image in the rectangular image plane. These distortions may, however, be at least partially compensated by the known methods of image processing.

For a virtually complete bird's eye view, four cameras are basically sufficient, which are arranged in the front region, rear region and at the sides of the machine frame. If the construction machine is, for example, a road milling machine, which has a transport device projecting a long way to the front or rear, an image display device with five cameras is advantageous.

A front loader road milling machine with a transport device on the front side of the machine frame preferably has two front cameras in the working direction, which are arranged on the two sides of the transport device. Two image regions extending forward in the working direction, which overlap one another in the region of the transport device, can be recorded on the two sides of the transport device using the two cameras, so that the surroundings in the region of the transport device can also be mapped. Moreover, in the case of a front loader road milling machine, a left-hand camera is preferably provided on the left-hand longitudinal side of the construction machine in the working direction and a right-hand camera is preferably provided on the right-hand longitudinal side of the construction machine in the working direction, so that a left-hand and a right-hand image region are recorded, and a rear camera is provided in the working direction, so that a rear image region is recorded. A plurality of cameras, for example a front and rear camera on each longitudinal side, may be provided at the longitudinal sides of particularly long construction machines.

In a rear loader construction machine with a transport device in the working direction at the rear side of the machine frame, the cameras may be arranged analogously to the front loader construction machine. The camera system in a rear loader construction machine preferably has two rear cameras in the working direction that are arranged on the two sides of the transport device, so that two rear image regions that overlap are recorded. Moreover, the camera system has a left-hand camera on the left-hand longitudinal side of the construction machine in the working direction and a right-hand camera on the right-hand longitudinal side of the construction machine in the working direction, so that a left-hand and a right-hand image region are recorded, and a front camera in the working direction on the front side of the machine frame so that a front image region is recorded.

The construction machine according to the invention and the method according to the invention preferably provide a determination of the course of the stitching depending on the height and incline of the machine frame in relation to the ground surface in such a way that when there is a transverse incline of the machine frame (rolling) from an orientation parallel to the ground surface, the opening angle spanned by the stitching of the left-hand lateral image detail and/or the stitching of the right-hand lateral image detail increases with an increasing incline of the machine frame in the transverse direction on one side of the machine frame or decreases on the other side of the machine frame.

When there is a longitudinal incline of the machine frame from a parallel orientation to the ground surface rearward or forward (pitching), the course of the front or rear stitching is determined in such a way that with an increasing incline of the machine frame in the longitudinal direction, the opening angle spanned by the front stitching increases or decreases with an increasing incline of the machine frame, while the opening angle spanned by the rear stitching decreases or increases.

In this context, the course of the stitching is taken to mean the spatial arrangement of the stitching, i.e. the line along which the stitching runs. The determination of the course of the stitching can take place using the known algorithms which calculate a displacement of the stitching line depending on the geometric conditions produced at a specific height and/or incline of the machine frame in relation to the ground surface.

BRIEF DESCRIPTION OF THE DRAWINGS

A plurality of embodiments of the invention will be described in detail below with reference to the drawings, in which.

DETAILED DESCRIPTION

Figure 1:
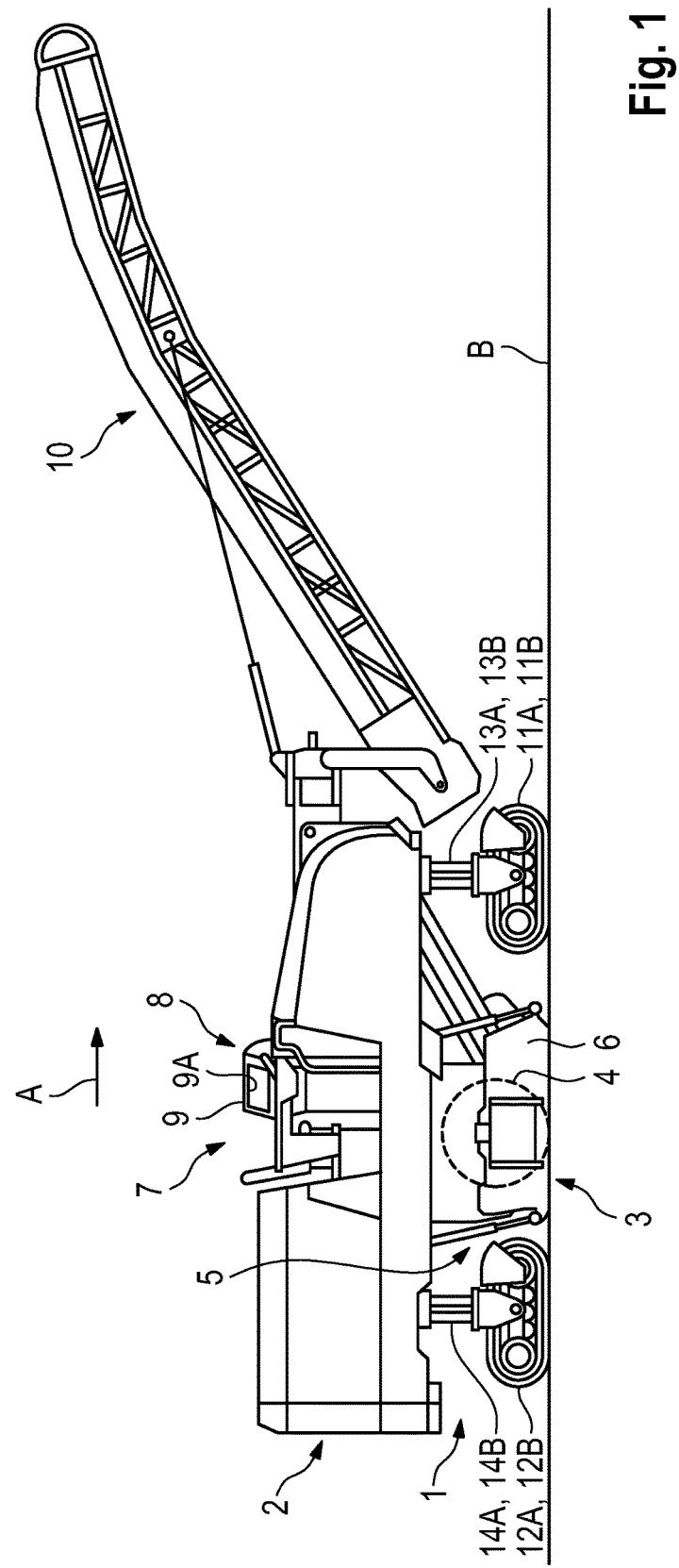
FIG. 1 is a side view of an embodiment of an automotive construction machine.
Figure 2:
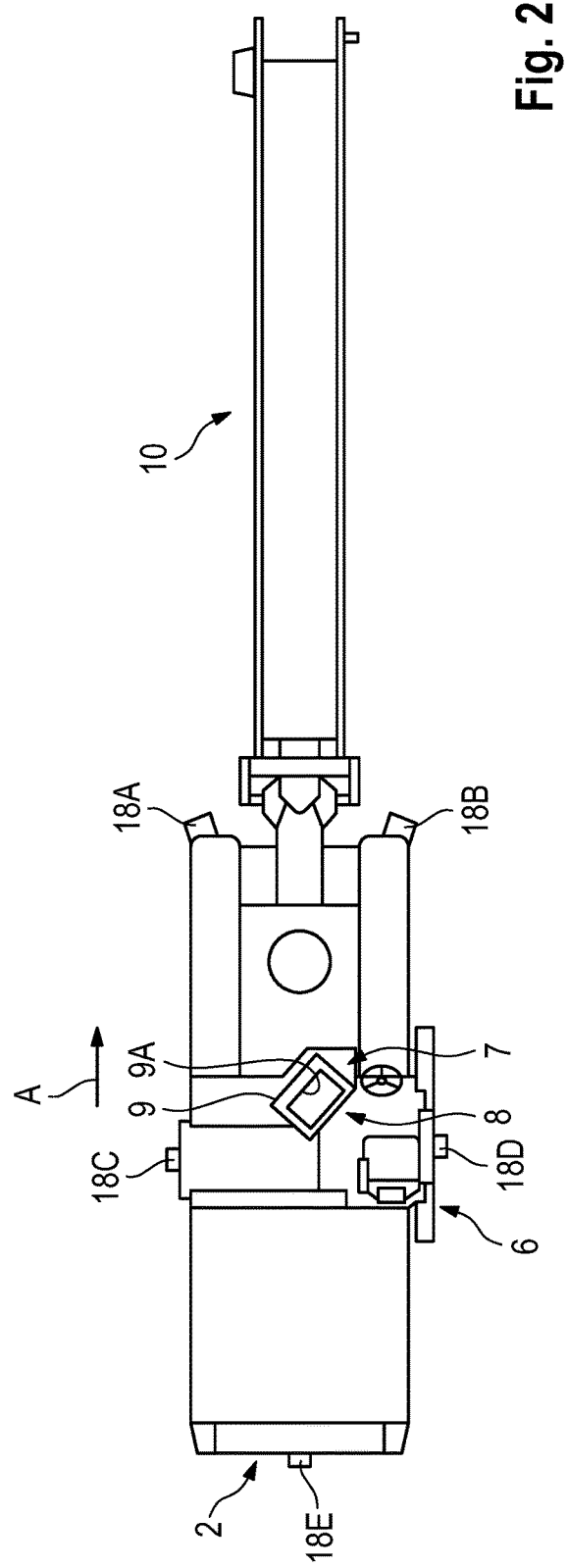
FIG. 2 is a plan view of the construction machine of FIG. 1.

As an example of an automotive construction machine, FIGS. 1 and 2 show, in a side and plan view, a road milling machine for milling road surfaces, this being a front loader road milling machine. The construction machine has a machine frame 2 carried by a chassis 1, on which a working device 3 is arranged. The working device 3 has a working roller, this being a milling roller. The milling roller 4, only indicated in FIG. 1, is arranged in a milling roller housing 5. On the left-hand and right-hand side in the working direction A, the milling roller housing 5 is closed by an edge protector 6. The milling roller housing 5 is closed by a hold-down device on the front side in the working direction A and by a stripper device on the rear side, which devices cannot be seen in FIG. 1. The control stand 7 with a control panel 8 for the machine operator is located on the machine frame above the milling roller housing 5. A display unit 9 with a display 9A is located on the control panel 8. The milled milling product is removed using a conveying device 10 extending forward in the working direction A, which is arranged pivotably in the vertical and horizontal plane on the front side of the machine frame 2.

The construction machine has, in the working direction A, a front left-hand running gear 11A and a front right-hand running gear 11B and a rear left-hand running gear 12A and a rear right-hand running gear 12B, with which are associated a front left-hand and right-hand lifting device 13A,B in the working direction A and a rear left-hand and right-hand lifting device 14A,B, so that by retracting and extending the lifting devices, the height and incline of the machine frame 2 in relation to the ground surface B can be changed. The running gears of the construction machine can be both crawler tracks and wheels. Using the height adjustment of the machine frame 2, the position of the edge protector resting in a floating manner on the ground as well as of the hold-down device and of the stripper device can be adjusted relative to the machine frame, these devices being movably arranged on the machine frame.

Figure 3:
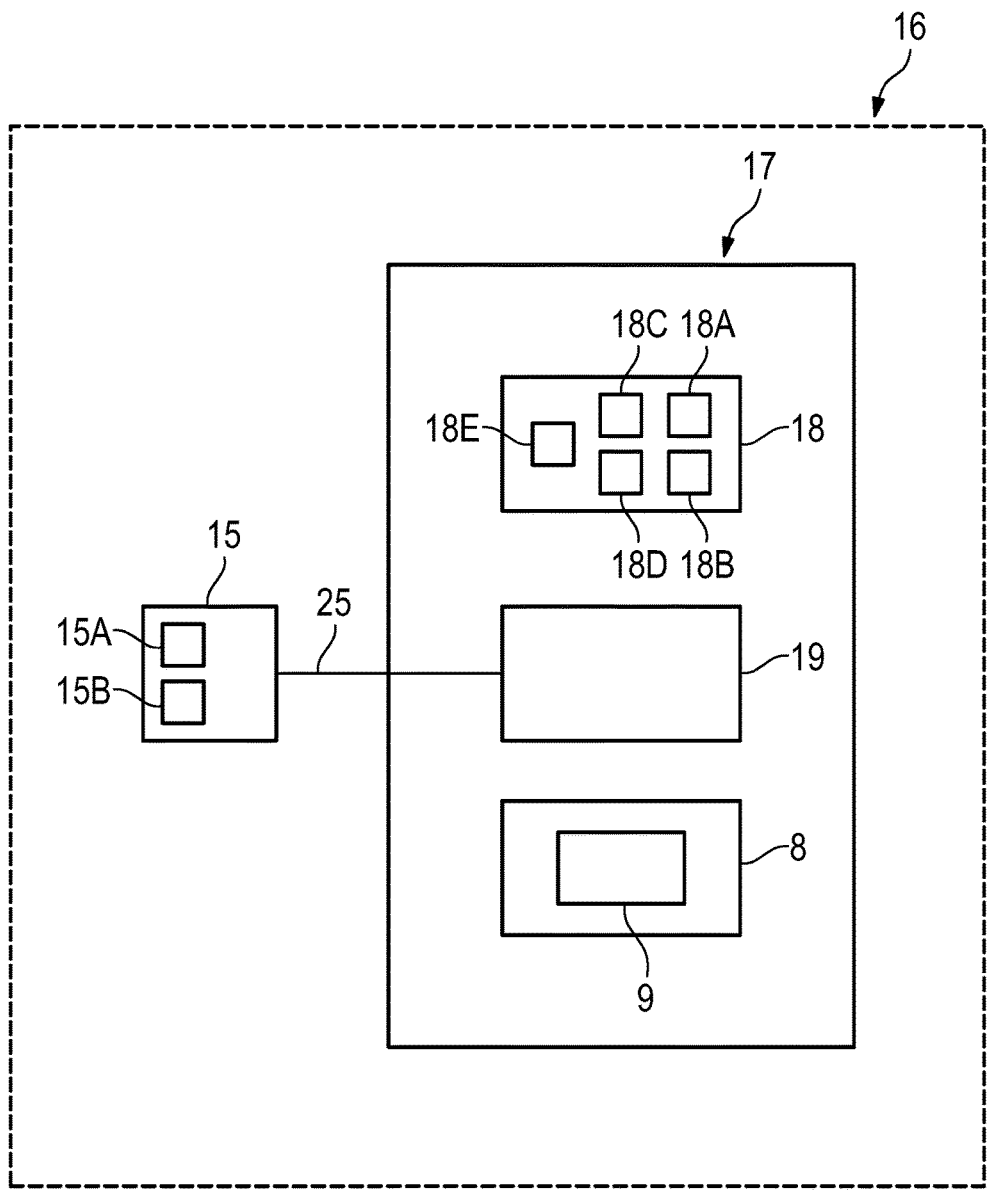
FIG. 3 is a simplified schematic view of the components of the image display device of the construction machine.

FIG. 3 is a simplified schematic view of the components of the construction machine. The construction machine has a position detection device 15 for detecting the height and/or incline of the machine frame 2 in relation to the ground surface B, which device can be a component of a central control and computing unit 16 of the construction machine. The position of the machine frame 2 can be calculated from data obtained from the lifting position of the lifting devices 13A,B and 14A,B and/or from the position of the edge protector, hold-down device or stripper device. The positions of the individual assemblies can be detected using suitable sensors.

The position detection device 15 has a computing unit 15A, which receives the data from the sensors 15B. The computing unit 15A is configured in such a way that the height and incline of the machine frame 2 in relation to the ground surface B is determined from the data from the sensors.

In the present embodiment, the position detection device 15 is configured in such a way that the height of the machine frame 2 in relation to the ground surface B and the incline of the machine frame in relation to the ground surface in a direction transverse to the working direction of the construction machine (rolling) and the incline of the machine frame in the longitudinal direction of the constriction machine (pitching) are calculated from the lifting position of the lifting devices 13A,B and 14A,B detected using the sensors 15B, for example using cable sensors. The position detection device 15 produces corresponding height, transverse incline and longitudinal incline data.

Moreover, the construction machine has an image display device 17 for displaying a bird's eye view image of the surroundings of the construction machine, which image display device has a camera system 18 and an image processing system 19. The image is displayed on the display 9A of the display unit 9 on the control stand 7 in the field of vision of the machine operator.

The structure and function of the image display device 17 will be described in detail below.

Figure 4:
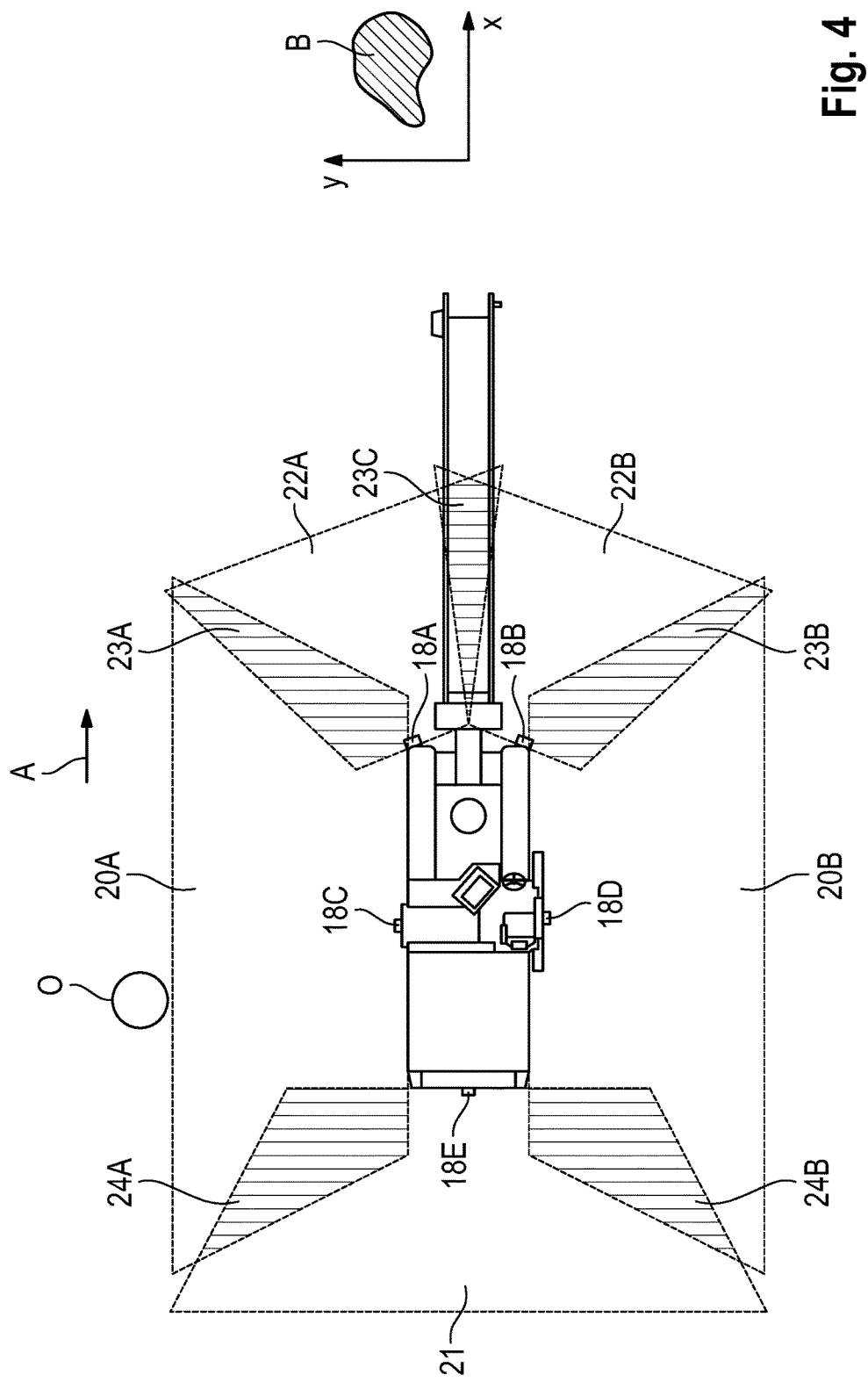
FIG. 4 is a simplified schematic view of the image regions recorded by the cameras of the image display device, the construction machine being in the lowest position.
Figure 5:
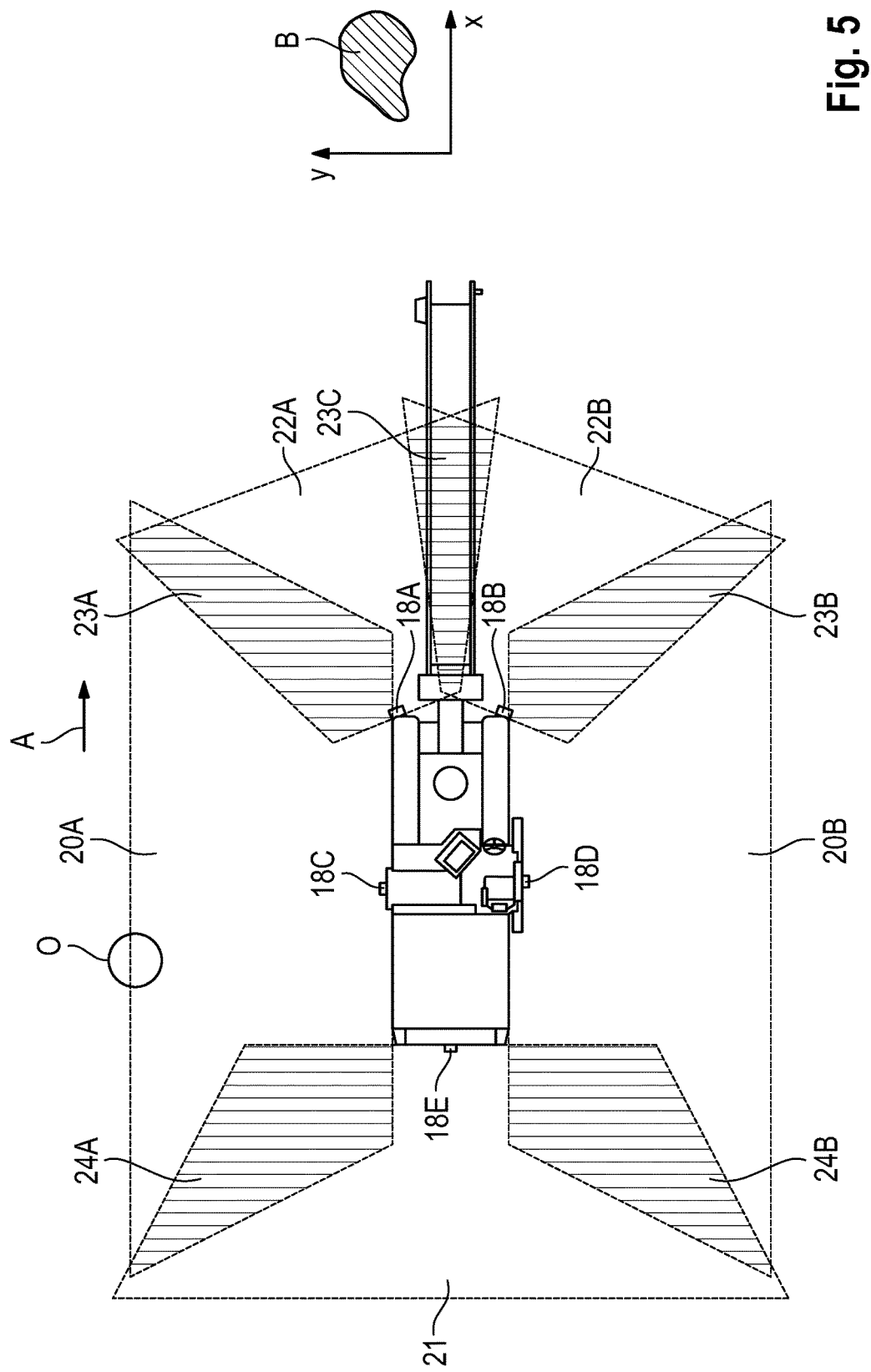
FIG. 5 shows the image regions recorded by the cameras, the construction machine being in the uppermost position.

FIG. 4 shows the construction machine in a parallel orientation to the ground surface B, all the lifting devices 13A,B and 14A,B being completely retracted and the machine frame 2 being lowered into the lowermost position, and FIG. 5 shows the construction machine in a parallel orientation to the ground surface B, all the lifting devices 13A,B and 14A,B being completely extended and the machine frame 2 being raised into the uppermost position.

Figure 6:
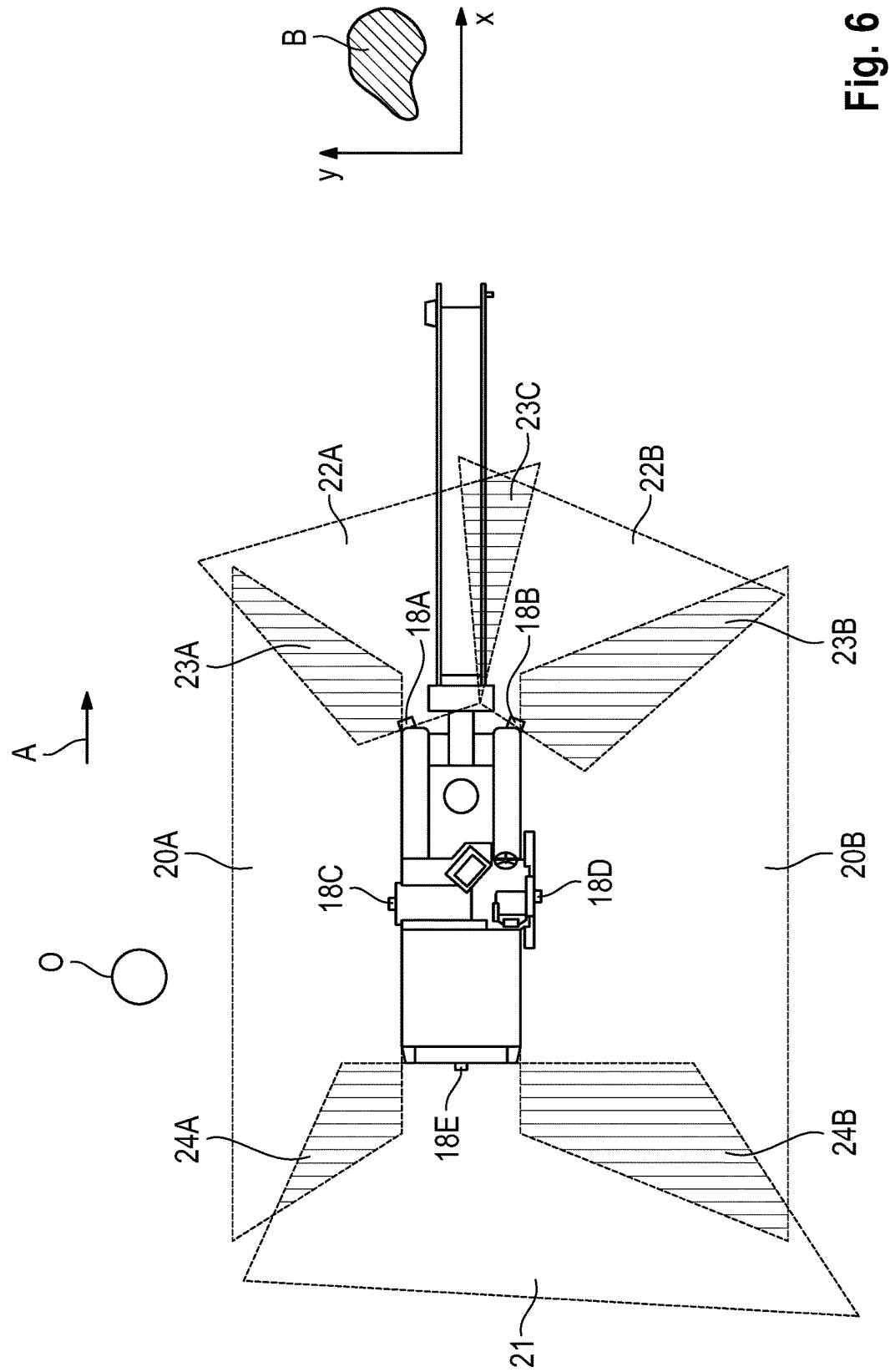
FIG. 6 shows the image regions recorded by the cameras, the construction machine being inclined to the left-hand side.

FIG. 6 shows the construction machine with an incline in the transverse direction to the left-hand side. In this position, the left-hand lifting devices 13A, 14A adopt the same lifting position and the right-hand lifting devices 13B, 14B adopt the same lifting position, the right-hand lifting devices being extended by a greater distance, however, than the left-hand lifting devices.

Figure 7:
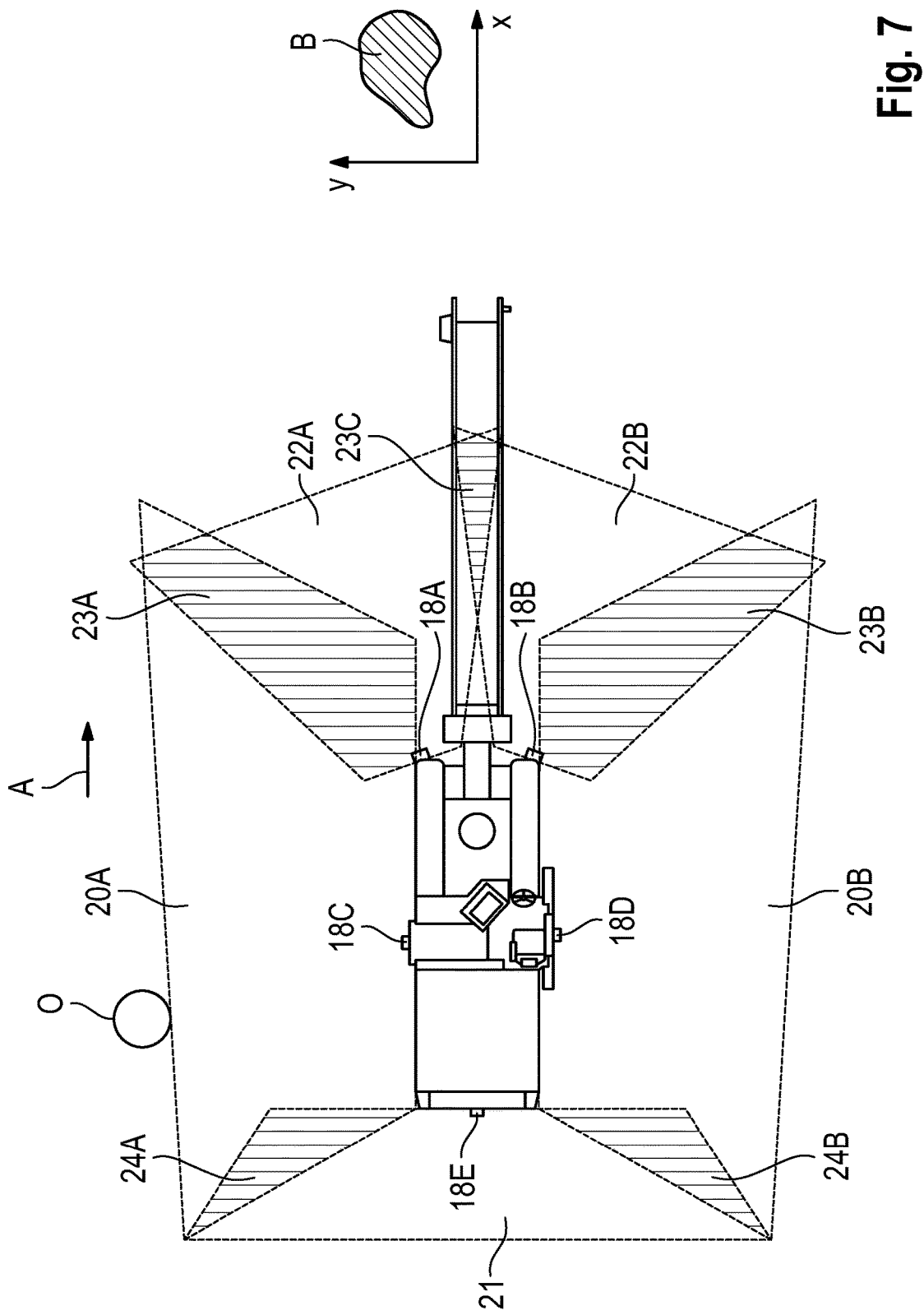
FIG. 7 shows the image regions recorded by the cameras, the construction machine being inclined rearward.

FIG. 7 shows the construction machine with an incline rearward in the longitudinal direction. In this position, the rear lifting devices 14A,B adopt the same lifting position and the front lifting devices 13A,B adopt the same lifting position, the front lifting devices being extended by a greater distance, however, than the rear lifting devices.

The camera system 18 comprises a plurality of cameras 18A,B,C,D,E provided on the machine frame 2 for recording individual overlapping image regions of the surroundings of the construction machine from different image recording positions. The cameras in each case record a specific image region of the ground surface B. The position and size of the image region recorded by the camera depends on the arrangement and orientation of the camera on the machine frame and the camera lens system, in particular the focal length of the lens of the camera.

FIG. 8A to 8D show a simplified schematic view of a camera 18A of the camera system 18, which camera is fastened to the machine frame 2. The camera is fastened to the machine frame at a specific setting angle in relation to the plane of the machine frame, so that the viewing direction 29 (camera axis) of the camera 18A is inclined downwardly in a sloping manner to the ground surface B when the machine frame 2 is oriented parallel to the ground surface. The ground surface B can be taken to be a plane when the height changes in the relevant region of the site are negligible, which is the case in practice.

Figure 8A:
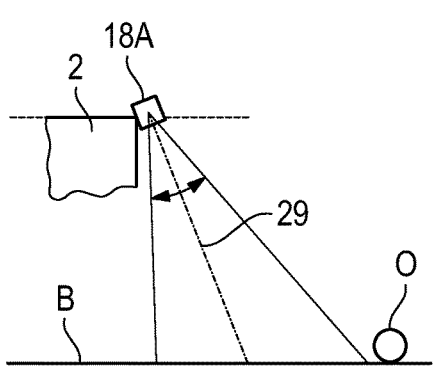
FIG. 8A to FIG. 8D show the viewing angle of a camera of the image display device for different camera positions.
Figure 8B:
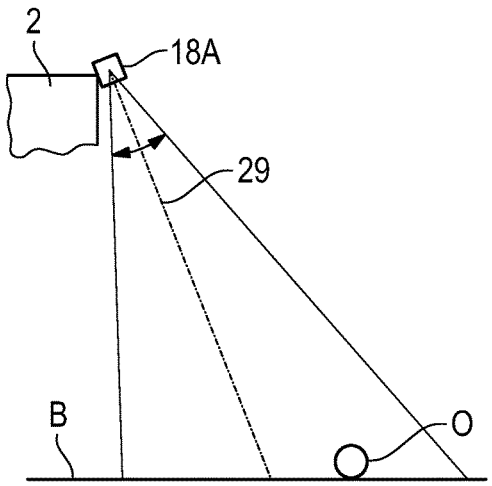
Figure 8C:
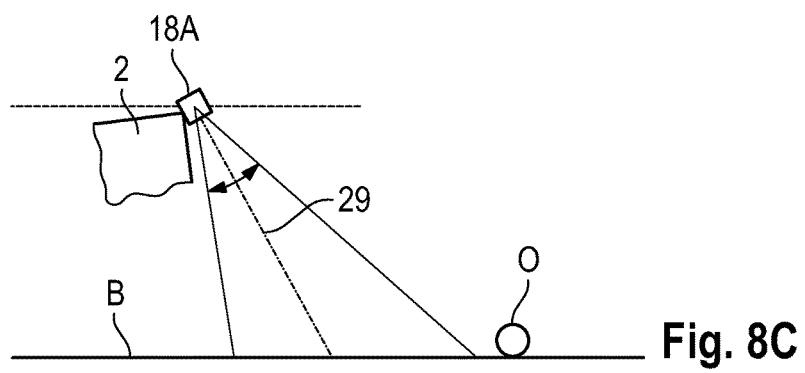
Figure 8D:
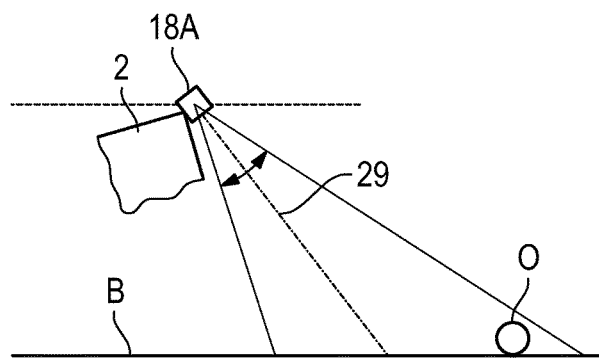

FIG. 8A to 8D illustrate that a change in the spacing and/or the incline of the camera 18A to the ground surface leads to a change in the region of the ground surface B detected by the camera. FIGS. 8A and 8B show different height positions of the machine frame 2 oriented parallel in relation to the ground surface B and FIGS. 8C and 8D show different inclines of the machine frame 2 at the same height. It is shown that depending on the spacing and/or the incline of the camera 18A, an object O is not detected (FIGS. 8A and 8C) or is detected (FIGS. 8B and 8D).

In the present embodiment, located at the front corner regions of the machine frame 2 are a front left-hand camera 18A in the working direction and a front right-hand camera 18B, a lateral left-hand camera 18C, preferably located centrally between the left-hand, front and rear corner regions of the machine frame, and a lateral right-hand camera 18D preferably located centrally between the right-hand, front and rear corner regions of the machine frame, and a rear camera 18E preferably located centrally between the rear corner regions of the machine frame.

It is assumed that each camera 18A,B,C,D,E would record a substantially rectangular image detail of the ground surface B if the viewing direction 29 of the camera (camera axis) was orthogonal to the ground surface. Because of the setting angle, a trapezoidal image region of the ground surface is recorded by the camera, however, i.e. the region of the site located outside the trapezoidal region is not detected by the camera.

The camera axes 29 (viewing directions) of the lateral cameras 18C and 18D and the rear camera 18E are preferably orthogonal to the longitudinal sides or the narrow side of the machine frame 2, the lateral cameras recording a trapezoidal lateral image region 20A, 20B and the rear camera recording a trapezoidal rear image region 21. The camera axes 29 may, however, also be directed forward or rearward in order to detect a larger front or rear site region. The image regions can then, however, not be described by isosceles trapeziums when there is a parallel orientation of the machine frame to the ground surface.

The camera axis 29 of the front left-hand camera 18A runs outwardly to the left in a sloping manner and the camera axis of the front right-hand camera 18B runs outwardly to the right in a sloping manner, so the front left-hand camera detects a front left-hand image region 22A and the front right-hand camera detects a front right-hand image region 22B.

When the machine frame 2 is raised from the lowermost position by extending all the lifting devices 13A,B and 14A,B into the uppermost position, the areas of the image regions 20A, 20B, 21, 22A, 22B increase. The area of an image region increases continuously with an increasing spacing of the camera from the ground surface.

FIG. 5 shows the construction machine in a parallel orientation to the ground surface, all the lifting devices 13A,B and 14A,B being completely extended and the machine frame 2 being raised into the uppermost position. The size of the image regions 20A, 20B, 21, 22A, 22B also changes when there is an incline of the machine frame 2 (rolling, pitching). When the machine frame 2 is inclined in the direction of the transverse axis Y to the left-hand side, the size of the right-hand lateral image region 20B increases, for example, while the size of the left-hand lateral image region 20A decreases, as the left-hand camera 18C is more strongly inclined in relation to the ground surface B than the right-hand camera 18D (FIG. 6). When the machine frame 2 is inclined, on the other hand, in the direction of the transverse axis Y to the right-hand side, the size of the right-hand image region 20B decreases, while the size of the left-hand image region 20A increases, as the right-hand camera is more strongly inclined in relation to the ground surface than the left-hand camera.

FIGS. 4 to 7 show that a change in the size of the image regions 20A, 20B, 22A, 22B, 21 can result in certain regions of the ground surface B not being detected by the image display device 17. In the lowermost position of the machine frame, for example, an object O located on the left-hand side is not detected (FIG. 4), while the object O is detected in the uppermost position (FIG. 5). For example, an object O located on the left-hand side may no longer be detected when the construction machine rolls to the left-hand side (FIGS. 5 and 6).

The position changes of the machine frame 2, to which the cameras 18A,B,C,D,E are fastened are limited by the lifting positions of the lifting devices 13A,B and 14A,B and the changes of the site to be expected. The arrangement or orientation and optical system of the camera is such that the image regions 20A, 20B, 21, 22A, 22B taken to be trapezoidal overlap one another under all possible positions of the machine frame 2 at the changes of the site to be expected.

A front left-hand overlapping region 23A of the image regions of the lateral left-hand camera 18C and of the front left-hand camera 18A and a front right-hand overlapping region 23B of the image regions of the lateral right-hand camera 18D and of the front right-hand camera 18B and a front central overlapping region 23C of the image regions of the front left-hand and right-hand cameras 18A, 18B are produced. Furthermore, a rear left-hand overlapping region 24A of the image regions of the lateral left-hand camera 28C and of the rear camera 18E and a rear right-hand overlapping region 24B of the image regions of the lateral right-hand camera 18D and of the rear camera 18E are produced.

The position detection device 15 is connected to the image processing system 19 by means of a data line 25, so that the image processing system 19 can receive the height data, transverse incline data and longitudinal incline data. The image processing system 19 is preferably a data processing unit (CPU), on which a data processing system (software) runs.

The image processing system 19, taking into account the height and incline of the machine frame 2, firstly determines the position of the contours, shown by dotted lines, of the individual image regions 20A, 20B, 21, 22A, 22B, the position and size of which change upon a change in the height and incline of the machine frame 2. The position of the straight contours can be described in a Cartesian X/Y coordinate system, which is located on the surface of the ground, by the starting and end points thereof. The coordinates of these points are calculated in the image processing system 19 according to an algorithm, which takes into account the height and incline of the machine frame.

Once the position and size of the image regions 20A, 20B, 21, 22A, 22B, which are described by the coordinates of the starting and end points of the contours, are known, the image processing system 19 determines the position and size of the overlapping regions 23A, 23B, 23C, 24A, 24B of the mutually adjoining image regions. The overlapping regions may, for example, be determined by calculating an intersection of adjacent image regions.

The image processing system 19 is configured in such a way that image details 20A', 20B', 21', 22A', 22B' (FIGS. 9 to 12) are determined in the individual image regions 20A, 20B, 21, 22A, 22B, i.e. suitable details from the recorded image regions of the ground surface B, which can be completely joined together to form a total image from a bird's eye view. When joining together the image details 20A', 20B', 21', 22A', 22B', stitching 26A, 26B, 26C, 27A, 27B is produced, i.e. boundary lines between the image details or intersecting lines of the image regions. The course of the stitching depends on the position and size of the overlapping trapezoidal image details.

The image processing system, in the X/Y coordinate system, determines the coordinates of the starting and end points of the contours of the front left-hand overlapping region 23A, the front right-hand overlapping region 23B, the front central overlapping region 23C, the rear left-hand overlapping region 24A and the rear right-hand overlapping region 24B. The overlapping regions are shown by hatched areas in FIGS. 4 to 7.

The image processing system thereupon determines the course of the stitching 26A, 26B, 26C, 27A, 27B, the following criteria being taken into account.

The position and size of the image regions 20A, 20B, 21, 22A, 22B and therefore also of the overlapping regions 23A, 23B, 23C, 24A, 24B depend on the height and incline of the machine frame 2 in relation to the ground surface B. The course of the stitching 26A, 26B, 26C, 27A, 27B is determined by the image processing system 19 in such a way that the stitching runs within the overlapping regions 23A, 23B, 23C, 24A, 24B of the image regions 20A, 20B, 21, 22A, 22B. Consequently, the stitching located within the overlapping regions between the image details 20A', 20B', 21', 22A', 22B' is determined depending on the height and incline of the machine frame in relation to the ground surface. The course of the stitching and the position and size of the image details are shown in FIGS. 9 to 12.

The image processing system 19 determines a left-hand front stitching 26A in the front left-hand overlapping region 23A, a right-hand front stitching 26B in the front right-hand overlapping region 23B, a central front stitching 26C in the front central overlapping region 23C, a left-hand rear stitching 27A in the rear left-hand overlapping region 24A and right-hand rear stitching 27B in the rear right-hand overlapping region 24B.

The starting and end points of the stitching are again described in the X/Y coordinate system by coordinates for the left-hand front stitching 26A, right-hand front stitching 26B, central front stitching 26C, left-hand rear stitching 27A and right-hand rear stitching 27B.

FIGS. 9 to 12 show how the course of the stitching 26A, 26B, 26C, 27A, 27B changes depending on the height and/or incline of the machine frame 2. It is shown that the opening angle α spanned by the stitching increases or decreases with an increasing incline of the machine frame 2.

The image processing unit 19 is therefore configured in such a way that when there is a transverse incline of the machine frame 2 from a parallel orientation to the ground surface B to the left-hand side, the course of the left-hand front and rear stitching 26A, 27A of the left-hand lateral image detail and/or the right-hand front and rear stitching 26B, 27B of the right-hand lateral image detail is determined in such a way that with an increasing incline of the machine frame to the left-hand side, the opening angle α spanned by the left-hand stitching 26A, 27A decreases and the opening angle α spanned by the right-hand stitching 26B, 27B increases (FIG. 11), and when there is a transverse incline of the machine frame 2 from a parallel orientation to the ground surface to the right-hand side, the course is determined in such a way that with an increasing incline of the machine frame, the opening angle spanned by the left-hand stitching increases and the opening angle spanned by the right-hand stitching decreases.

When there is a longitudinal incline of the machine frame from a parallel orientation to the ground surface B rearward (FIG. 12), the course of the front stitching 26A, 26B, 26C is determined by the image processing system 19 in such a way that with an increasing incline of the machine frame 2, the opening angle α spanned by the left-hand and central stitching 26A, 26C and the opening angle α spanned by the right-hand and central stitching 26B, 26C increases, and the course of the rear stitching 17A, 27B is determined in such a way that with an increasing incline of the machine frame 2, the opening angle α spanned by the left-hand and right-hand rear stitching 27A, 27B decreases.

When there is a longitudinal incline of the machine frame 2 from a parallel orientation to the ground surface B forward, the course of the front stitching 26A, 26B, 26C is determined in such a way that with an increasing incline of the machine frame 2, the opening angle α spanned by the left-hand and central stitching 26A, 26C and the opening angle α spanned by the right-hand and central stitching 26B, 26C decreases, and the course of the rear stitching 27A, 27B is determined in such a way that with an increasing incline of the machine frame, the opening angle α spanned by the left-hand and right-hand rear stitching 27A, 27B increases.

In the present embodiment, the course of the stitching is determined in such a way that the starting points of the left-hand and right-hand front stitching 26A, 26B and the starting points of the left-hand and right-hand rear stitching 27A, 27B, regardless of the height and incline of the machine frame 2, are located on the corner points of the machine frame. When the machine is not inclined to the side, the starting point of the central front stitching 26C is located centrally between the starting points of the left-hand and right-hand front stitching 26A, 26B on the longitudinal axis X of the machine frame. When there is a transverse incline of the machine, the starting point of the central front stitching 26C is displaced to the respective side. In this case, it is approximately assumed that the starting points of the stitching at the corner points of the machine frame 2 in all the positions of the machine frame are always located in the region of the overlapping regions 23A, 23B, 23C, 24A, 24B.

Figure 9:
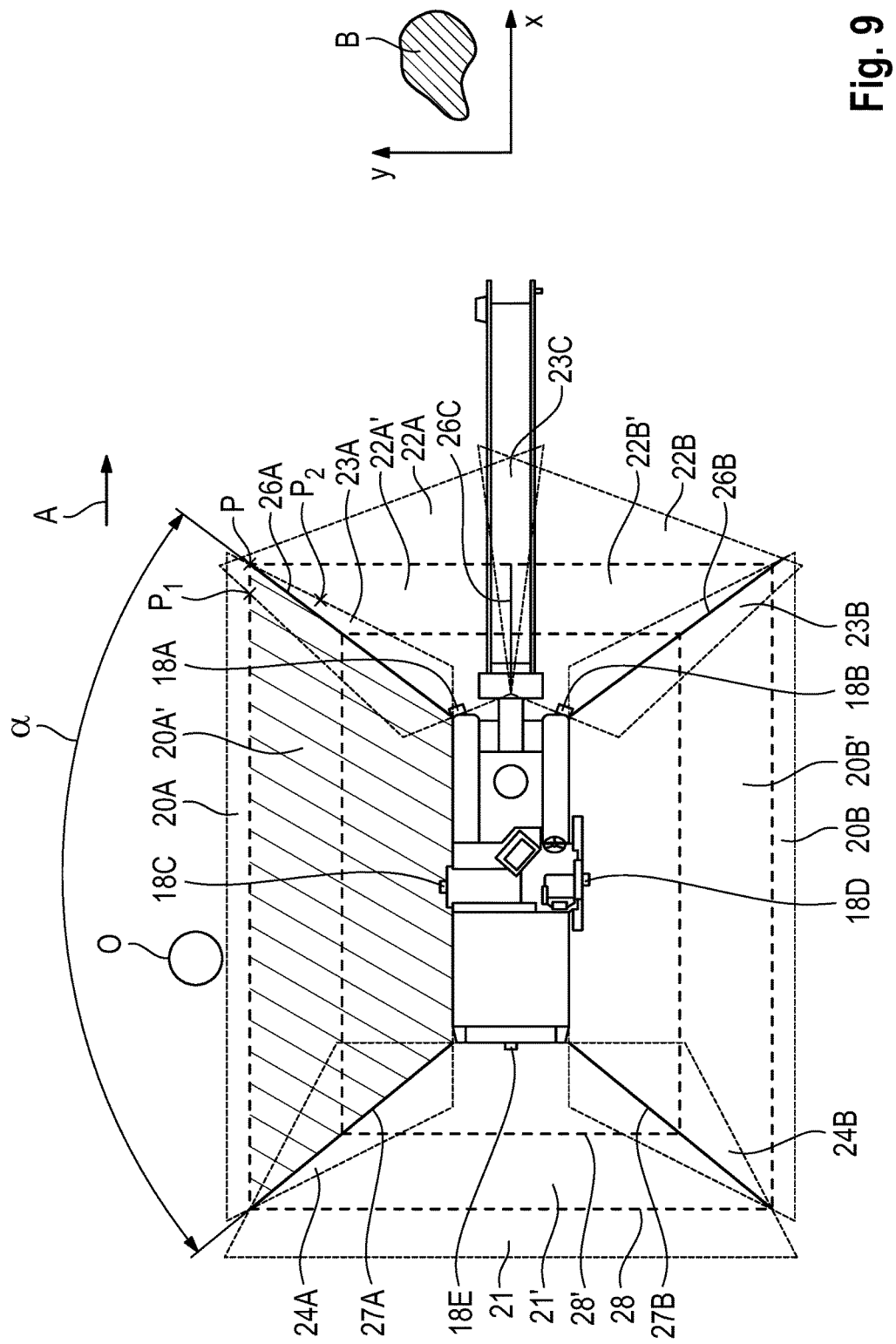
FIG. 9 shows the construction machine of FIG. 4, the stitching and image details being shown.
Figure 10:
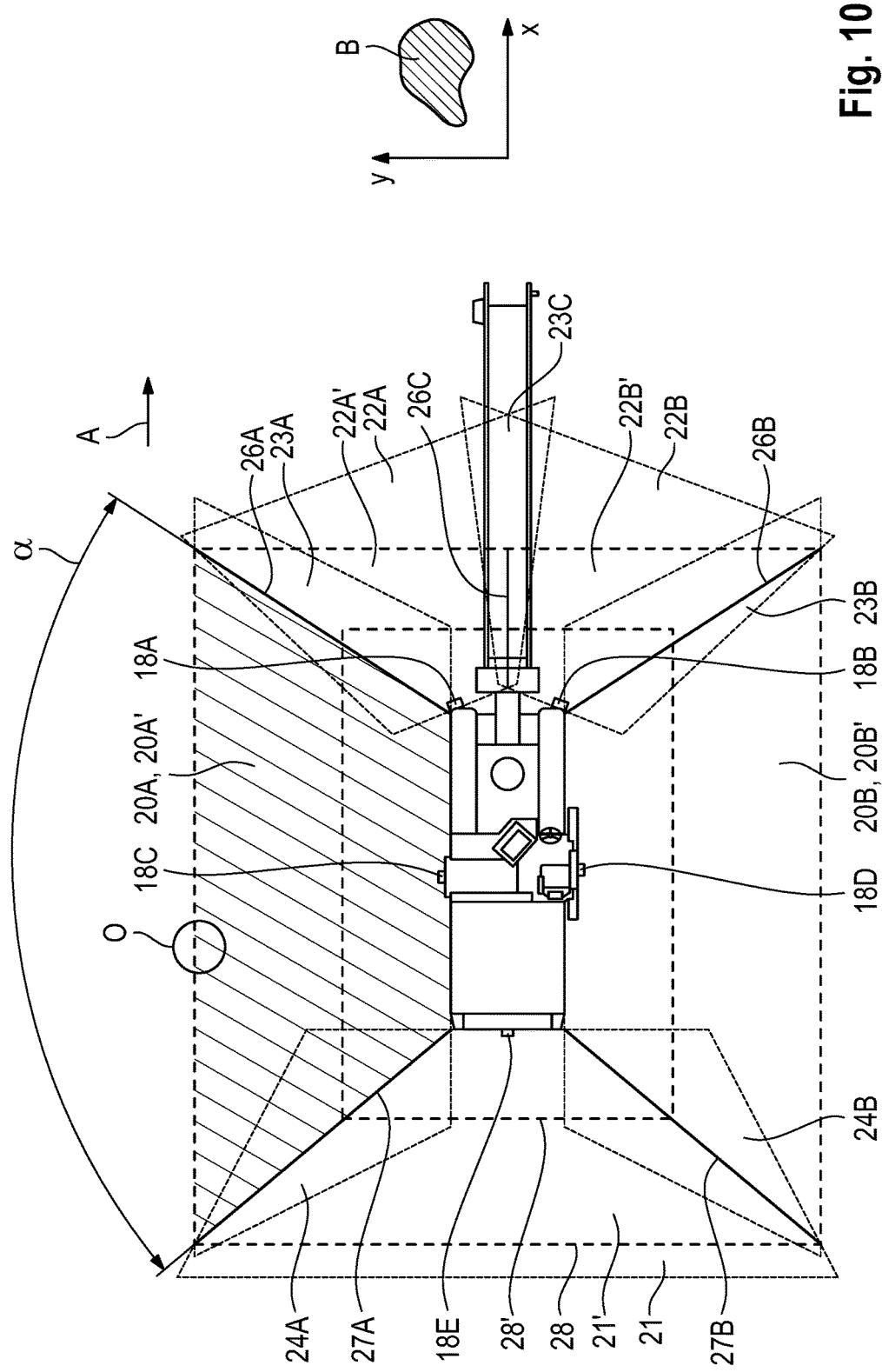
FIG. 10 shows the construction machine of FIG. 5, the stitching and image details being shown.

It is shown in FIGS. 9 to 12 that different end points, which are located within the overlapping regions 23A, 23B, 23C, 24A, 24B, can be determined for the stitching 26A, 26B, 26C, 27A, 27B. For example, the end point P of the stitching 23A could also be placed on the point P1 or P2 (FIG. 9). Depending on the selection of the end points P, the total image can therefore be joined together from different image details. Consequently, different regions of the ground surface, which can be completely and clearly shown from a bird's eye view, are also produced.

The image processing system preferably determines the end points P in such a way that as large a region as possible of the surroundings is captured completely with all the cameras. In this regard, different criteria can be predetermined. For example, the view forward can be extended at the cost of the view rearward or vice versa. However, the view to the left-hand side can also be extended at the cost of the view to the right-hand side or vice versa.

The course of the stitching 26A, 26B, 26C, 27A, 27B also determines the position and size of the image details 20A', 20B', 21', 22A', 22B' to be selected depending on the height and incline of the machine frame 2. The total image is preferably a rectangular image, which can be shown on the rectangular display 9A of the display unit 9, the image details being the details of the image regions located between the stitching in the total image.

Figure 11:
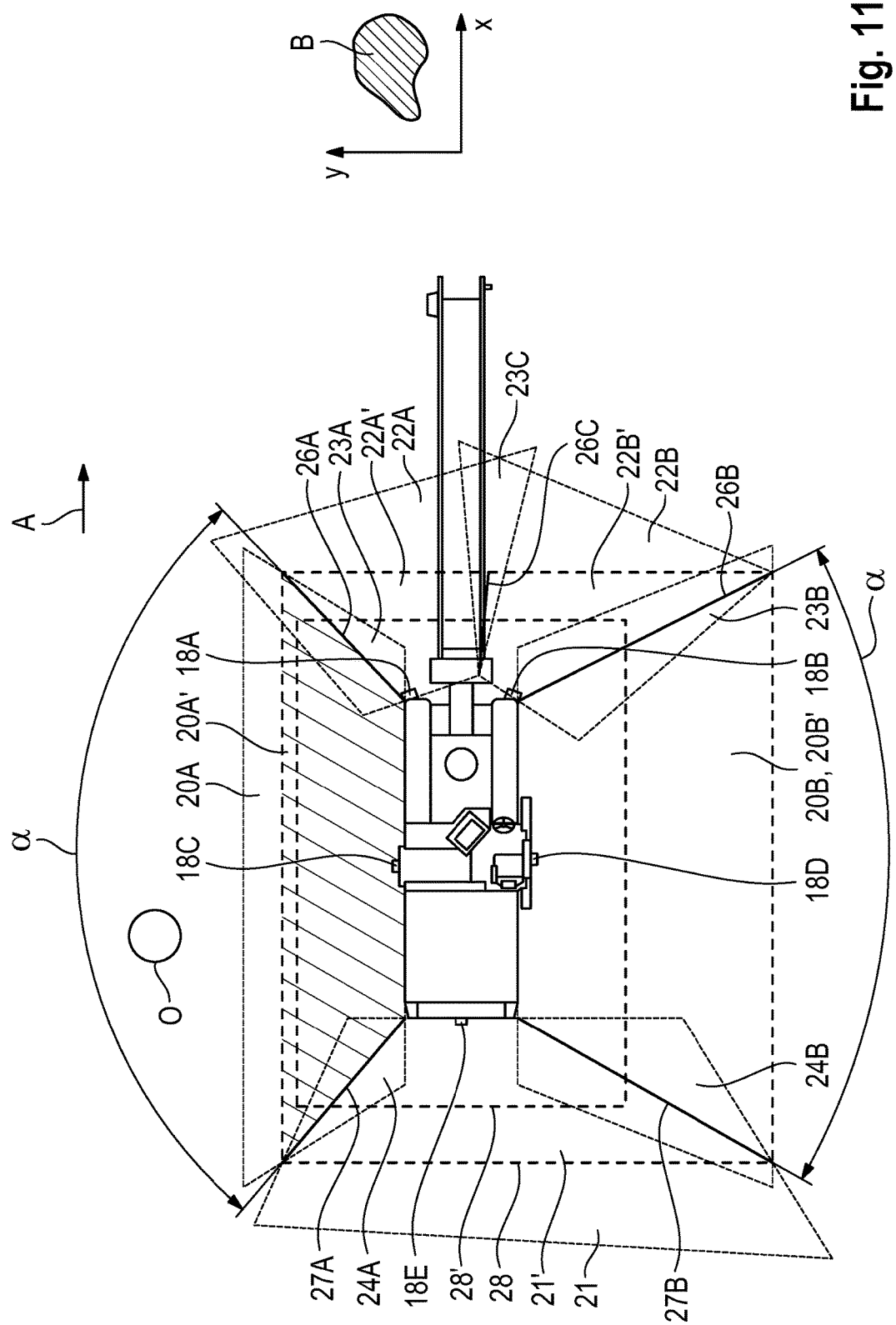
FIG. 11 shows the construction machine of FIG. 6, the stitching and image details being shown.
Figure 12:
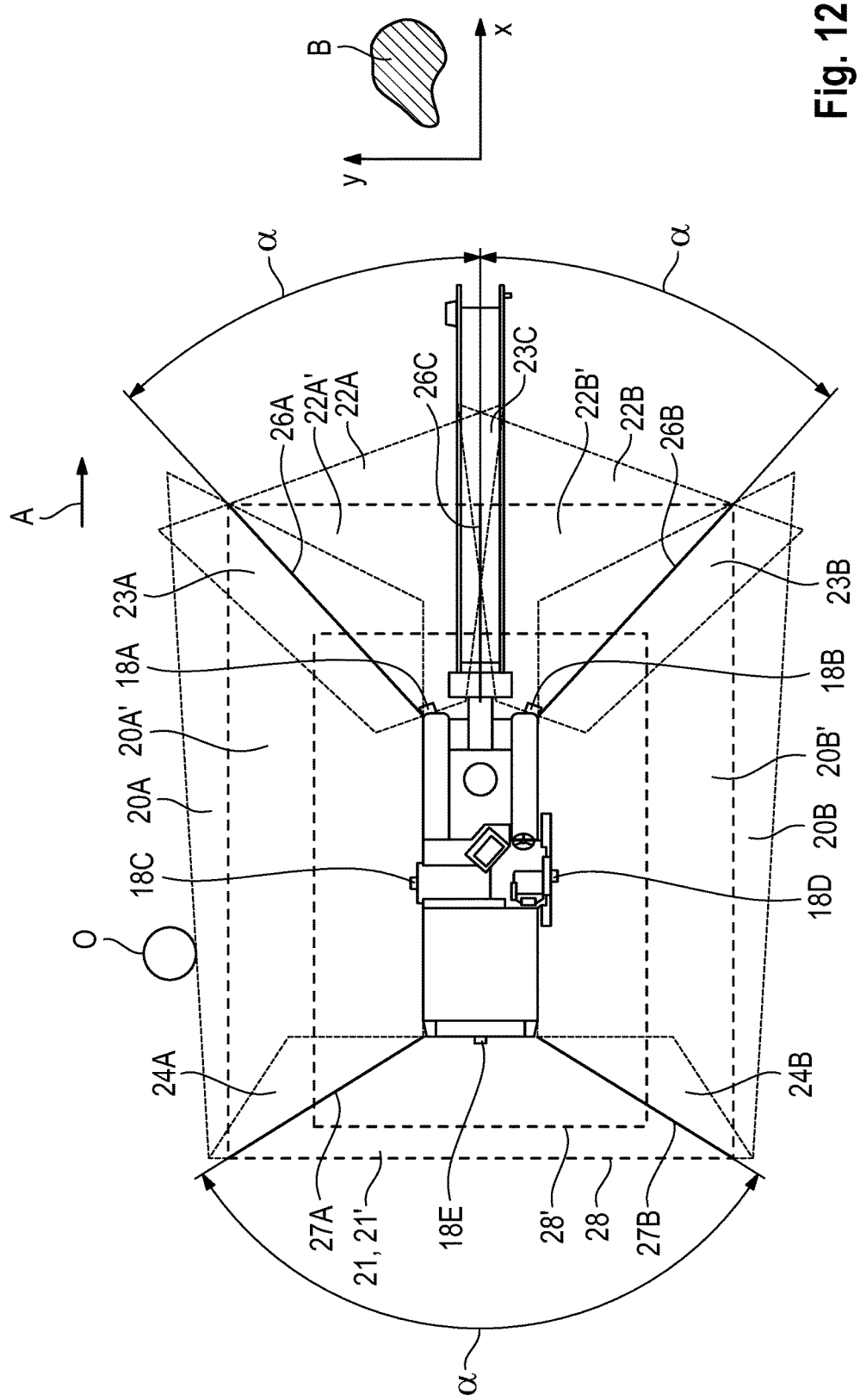
FIG. 12 shows the construction machine of FIG. 7, the stitching and image details being shown.

The image processing system 19 produces a total image by joining together the image details, the corner points of the total image being located on the end points of the stitching. The total image shown by the display unit 9 is identified by a dashed line 28 in FIGS. 8 to 12. It is shown in FIGS. 9 to 12 that the total image 28 indeed becomes larger or smaller when raising or lowering the machine frame 2 (FIGS. 9 and 10), but retains its symmetry with respect to the machine frame. A rolling or pitching of the construction machine leads, however, to a displacement of the total image 28 forward or rearward or to the left-hand or right-hand side (FIGS. 11 and 12). The image processing system 19 therefore provides different viewing modes, which can be selected by the machine operator using an input unit on the control panel 7.

The machine operator can input a viewing mode, in which only one detail 28' of the total image 28 is shown in a bird's eye view. The image detail 28' from the total image 28 is preferably a rectangular detail again, which is shown by dashed lines 28' in FIGS. 9 to 12. This detail 28' is determined in such a way that, for all the possible positions of the construction machine, a displacement of the image shown by the display unit 9 does not occur, i.e. regions not detected in individual positions are located outside the image region shown. For this purpose, the detail 28' from the total image 28 is dimensioned correspondingly smaller by the image processing system 19.

What is claimed is:

1. An automotive construction machine, comprising:
   a machine frame having a working direction;
   front and rear running gears;
   a working tool connected to the machine frame for removing ground material from a ground surface;
   a plurality of lifting devices, each lifting device supporting the machine frame from one of the running gears, so that each lifting device can be retracted and extended to raise or lower the respective running gear in relation to the machine frame so that a height and an incline of the machine frame in relation to the ground surface can be changed;
   a sensor system comprising a plurality of sensors configured to provide data corresponding to a respective lifting position for each of the plurality of lifting devices;
   a computing unit configured to determine from the data at least the incline of the machine frame in relation to the ground surface;
   a camera system including a plurality of cameras arranged to record overlapping individual image regions of surroundings of the construction machine from different image recording positions relative to the machine frame;
   an image processing system operably associated with the sensor system and configured such that image details of the overlapping individual image regions are joined together to form a total image from a bird's eye view, and the image processing system being further configured such that a course of stitching between the image details is determined depending on at least the incline of the machine frame in relation to the ground surface; and
   a display unit configured to display the total image.

2. The construction machine of claim 1, wherein:
   the image processing system is configured such that the course of stitching between the image details is determined such that the stitching is located within overlapping portions of the overlapping individual image regions and the course of stitching is based at least upon at least one of:
   transverse incline data describing a transverse incline of the machine frame in relation to the ground surface in a direction transverse to the working direction: and
   longitudinal incline data describing a longitudinal incline of the machine frame in relation to the ground surface in a direction parallel to the working direction.

3. The construction machine of claim 2, wherein:
   the image processing system is configured such that contours of the individual image regions are determined based at least upon at least one of the transverse incline data and the longitudinal incline data to determine the course of stitching between the image details, and the overlapping portions of the image regions are determined based on the contours.

4. The construction machine of claim 1, wherein:
   the image processing system is configured such that the image details of the individual image regions are joined together to form a substantially rectangular total image from a bird's eye view.

5. The construction machine of claim 1, wherein:
   the machine frame includes longitudinal sides and transverse sides; and
   the image processing system is configured such that a symmetrical detail of the total image in relation to either the longitudinal sides or the transverse sides is shown from a bird's eye view.

6. The construction machine of claim 1, wherein:
   the machine frame includes a front side, a rear side, a left-hand longitudinal side and a right-hand longitudinal side;
   the construction machine is a front loader construction machine including a transport conveyor extending in the working direction from the front side of the machine frame; and
   the plurality of cameras of the camera system includes:
      a left-hand front camera and a right-hand front camera located to the left and right, respectively, from the transport conveyor and facing substantially forward so that two front image regions that overlap are recorded;
      a left-hand camera facing to the left from left-hand longitudinal side so that a left-hand image region is recorded;
      a right-hand camera facing to the right from the right-hand longitudinal side so that a right-hand image region is recorded; and
      a rear camera facing rearward from the rear side so that a rear image region is recorded.

7. The construction machine of claim 6, wherein:
   the machine frame includes a left-hand front corner region, a right-hand front corner region, a left-hand rear corner region and a right-hand rear corner region;
   the left-hand front camera is arranged in the left-hand front corner region of the machine frame;
   the right-hand front camera is arranged in the right-hand front corner region of the machine frame;
   the left-hand camera is arranged centrally between the left-hand front and left-hand rear corner regions of the machine frame;
   the right-hand camera is arranged centrally between the right-hand front and right-hand rear corner regions of the machine frame; and the rear camera is arranged centrally between the left-hand rear and right-hand rear corner regions of the machine frame.

8. The construction machine of claim 7, wherein the image processing system is further configured such that the course of stitching is determined such that:
a left-hand front image detail and a right-hand front image detail are defined, the left-hand front image detail being laterally limited by a left-hand front stitching extending from the left-hand front corner region and by a front central stitching extending from the front side, and the right-hand front image detail being laterally limited by a right-hand front stitching extending from the right-hand front corner region and by the front central stitching;
a left-hand lateral image detail and a right-hand lateral image detail are defined, the left-hand lateral image detail being laterally limited by a left-hand rear stitching extending from the left-hand rear corner region and by the left-hand front stitching, and the right-hand lateral image detail being laterally limited by a right-hand rear stitching extending from the right-hand rear corner region and by the right front stitching; and
a rear image detail being laterally limited by the left-hand rear stitching and by the right-hand rear stitching.

9. The construction machine of claim 8, wherein the image processing system is further configured such that:
with an increasing transverse incline of the machine frame from a parallel orientation to the ground surface to the left-hand side, the course of stitching is determined such that an opening angle spanned by the left-hand front stitching and the left-hand rear stitching decreases and an opening angle spanned by the right-hand front stitching and the right-hand rear stitching increases; and
with an increasing transverse incline of the machine frame to the right-hand side, the course of stitching is determined such that the opening angle spanned by the right-hand front stitching and the right-hand rear stitching decreases and the opening angle spanned by the left-hand front stitching and the left-hand rear stitching increases.

10. The construction machine of claim 8, wherein the image processing system is further configured such that:
with an increasing longitudinal incline of the machine frame from a parallel orientation to the ground surface forward, the course of stitching is determined such that an opening angle spanned by the left-hand front stitching and the front central stitching decreases, an opening angle spanned by the right-hand front stitching and the front central stitching decreases, and an opening angle spanned by the left-hand rear stitching and the right-hand rear stitching increases; and
with an increasing longitudinal incline of the machine frame from a parallel orientation to the ground surface rearward, the course of stitching is determined such that the opening angle spanned by the left-hand front stitching and the front central stitching increases, the opening angle spanned by the right-hand front stitching and the front central stitching increases, and the opening angle spanned by the left-hand rear stitching and the right-hand rear stitching decreases.

11. The construction machine of claim 1, wherein:
the computing unit is configured to determine from the detected lifting positions of the lifting devices at least one of:
transverse incline data describing a transverse incline of the machine frame in relation to the ground surface in a direction transverse to the working direction: and
longitudinal incline data describing a longitudinal incline of the machine frame in relation to the ground surface in a direction parallel to the working direction.

12. A method of displaying an image of the surroundings of an automotive construction machine, the construction machine including a machine frame, front and rear running gears, a working tool supported from the machine frame for removing ground material from a ground surface, and a plurality of lifting devices, each lifting device supporting the machine frame from one of the running gears so that each lifting device can be retracted and extended to raise or lower the respective running gear in relation to the machine frame so that a height and an incline of the machine frame in relation to the ground surface can be changed, the method comprising:
(a) detecting a respective lifting position for each of the plurality of lifting devices, and determining from the lifting positions of the lifting devices at least the incline of the machine frame in relation to the ground surface;
(b) recording overlapping individual image regions of the construction machine surroundings from different image recording positions using a plurality of cameras supported from the machine frame;
(c) joining together image details of the individual image regions to form a total image from a bird's eye view, and determining a course of stitching between the image details depending on at least the incline of the machine frame in relation to the ground surface; and
(d) displaying the total image.

13. The method of claim 12, wherein:
in step (c) total image is substantially rectangular.

14. The method of claim 12, the machine frame including front and rear transverse sides and left and right longitudinal sides, wherein:
in step (c) a detail of the total image that is symmetrical in relation to the longitudinal sides and/or the transverse sides of the machine frame is displayed from a bird's eye view.

15. The method of claim 12, the construction machine being a front loader construction machine with a transport conveyor on a front side of the construction machine, wherein:
in step (b) the overlapping individual image regions include:
left and right overlapping front image regions recorded using two front cameras arranged on left and right sides, respectively, of the transport conveyor;
a left-hand image region recorded using a left-hand camera on a left-hand longitudinal side of the construction machine;
a right-hand image region recorded using a right-hand camera on a right-hand longitudinal side of the construction machine; and
a rear image region recorded using a rear camera.

16. The method of claim 15, wherein in step (c):
the course of stitching includes a left-hand front stitching between the left front image region and the left-hand image region, a left-hand rear stitching between the left-hand image region and the rear image region, a right-hand front stitching between the right front image region and the right-hand image region, and a right-hand rear stitching between the right-hand image region and the rear image region;

with an increasing transverse incline of the machine frame from a parallel orientation to the ground surface to the left-hand longitudinal side, the course of stitching is determined such that an opening angle spanned by the left-hand front stitching and the left-hand rear stitching decreases and an opening angle spanned by the right-hand front stitching and the right-hand rear stitching increases; and with an increasing transverse incline of the machine frame to the right-hand longitudinal side, the course of stitching is determined such that the opening angle spanned by the right-hand front stitching and the right-hand rear stitching decreases and the opening angle spanned by the left-hand front stitching and the left-hand rear stitching increases.

17. The method of claim 15, wherein in step (c):

the course of stitching includes a left-hand front stitching between the left front image region and the left-hand image region, a left-hand rear stitching between the left-hand image region and the rear image region, a right-hand front stitching between the right front image region and the right-hand image region, a right-hand rear stitching between the right-hand image region and the rear image region, and a front central stitching between the left-hand front stitching and the right-hand front stitching;

with an increasing longitudinal incline of the machine frame from a parallel orientation to the ground surface forward, the course of stitching is determined such that an opening angle spanned by the left-hand front stitching and the front central stitching decreases, an opening angle spanned by the right-hand front stitching and the front central stitching decreases, and an opening angle spanned by the left-hand rear stitching and the right-hand rear stitching increases; and with an increasing longitudinal incline of the machine frame from a parallel orientation to the ground surface rearward, the course of stitching is determined such that the opening angle spanned by the left-hand front stitching and the front central stitching increases, the opening angle spanned by the right-hand front stitching and the front central stitching increases, and the opening angle spanned by the left-hand rear stitching and the right-hand rear stitching decreases.

18. The method of claim 15, wherein in step (c):

the course of stitching includes a left-hand front stitching between the left front image region and the left-hand image region, a left-hand rear stitching between the left-hand image region and the rear image region, a right-hand front stitching between the right front image region and the right-hand image region, and a right-hand rear stitching between the right-hand image region and the rear image region;

with an increasing transverse incline of the machine frame from a parallel orientation to the ground surface to the left-hand longitudinal side, the course of stitching is determined such that an opening angle spanned by the left-hand front stitching and the left-hand rear stitching decreases and an opening angle spanned by the right-hand front stitching and the right-hand rear stitching increases; and with an increasing transverse incline of the machine frame to the right-hand longitudinal side, the course of stitching is determined such that the opening angle spanned by the right-hand front stitching and the right-hand rear stitching decreases and the opening angle spanned by the left-hand front stitching and the left-hand rear stitching increases.

19. An automotive front loader construction machine, comprising:

a machine frame having a working direction and including a front side, a rear side, a left-hand longitudinal side and a right-hand longitudinal side;

a transport conveyor extending in the working direction from the front side of the machine frame;

front and rear running gears;

a working tool connected to the machine frame for removing ground material from a ground surface;

a plurality of lifting devices, each lifting device supporting the machine frame from one of the running gears, so that each lifting device can be retracted and extended to raise or lower the respective running gear in relation to the machine frame so that a height and an incline of the machine frame in relation to the ground surface can be changed;

a sensor system configured to detect at least one of the height and the incline of the machine frame in relation to the ground surface;

a camera system including a plurality of cameras arranged to record overlapping individual image regions of surroundings of the construction machine from different image recording positions relative to the machine frame, wherein the plurality of cameras includes a left-hand front camera and a right-hand front camera located to the left and right, respectively, from the transport conveyor and facing substantially forward so that two front image regions that overlap are recorded;

a left-hand camera facing to the left from left-hand longitudinal side so that a left-hand image region is recorded;

a right-hand camera facing to the right from the right-hand longitudinal side so that a right-hand image region is recorded; and a rear camera facing rearward from the rear side so that a rear image region is recorded;

an image processing system operably associated with the sensor system and configured such that image details of the overlapping individual image regions are joined together to form a total image from a bird's eye view, and the image processing system being further configured such that a course of stitching between the image details is determined depending on at least one of the height and the incline of the machine frame in relation to the ground surface; and a display unit configured to display the total image.

20. The construction machine of claim 19, wherein:

the machine frame includes a left-hand front corner region, a right-hand front corner region, a left-hand rear corner region and a right-hand rear corner region;

the left-hand front camera is arranged in the left-hand front corner region of the machine frame;

the right-hand front camera is arranged in the right-hand front corner region of the machine frame;

the left-hand camera is arranged centrally between the left-hand front and left-hand rear corner regions of the machine frame;

the right-hand camera is arranged centrally between the right-hand front and right-hand rear corner regions of the machine frame; and the rear camera is arranged centrally between the left-hand rear and right-hand rear corner regions of the machine frame.

21. The construction machine of claim 20, wherein the image processing system is further configured such that the course of stitching is determined such that:
   a left-hand front image detail and a right-hand front image detail are defined, the left-hand front image detail being laterally limited by a left-hand front stitching extending from the left-hand front corner region and by a front central stitching extending from the front side, and the right-hand front image detail being laterally limited by a right-hand front stitching extending from the right-hand front corner region and by the front central stitching;
   a left-hand lateral image detail and a right-hand lateral image detail are defined, the left-hand lateral image detail being laterally limited by a left-hand rear stitching extending from the left-hand rear corner region and by the left-hand front stitching, and the right-hand lateral image detail being laterally limited by a right-hand rear stitching extending from the right-hand rear corner region and by the right front stitching; and
   a rear image detail being laterally limited by the left-hand rear stitching and by the right-hand rear stitching.

22. The construction machine of claim 21, wherein the image processing system is further configured such that:
   with an increasing transverse incline of the machine frame from a parallel orientation to the ground surface to the left-hand side, the course of stitching is determined such that an opening angle spanned by the left-hand front stitching and the left-hand rear stitching decreases and an opening angle spanned by the right-hand front stitching and the right-hand rear stitching increases; and
   with an increasing transverse incline of the machine frame to the right-hand side, the course of stitching is determined such that the opening angle spanned by the right-hand front stitching and the right-hand rear stitching decreases and the opening angle spanned by the left-hand front stitching and the left-hand rear stitching increases.

23. The construction machine of claim 21, wherein the image processing system is further configured such that:
   with an increasing longitudinal incline of the machine frame from a parallel orientation to the ground surface forward, the course of stitching is determined such that an opening angle spanned by the left-hand front stitching and the front central stitching decreases, an opening angle spanned by the right-hand front stitching and the front central stitching decreases, and an opening angle spanned by the left-hand rear stitching and the right-hand rear stitching increases; and
   with an increasing longitudinal incline of the machine frame from a parallel orientation to the ground surface rearward, the course of stitching is determined such that the opening angle spanned by the left-hand front stitching and the front central stitching increases, the opening angle spanned by the right-hand front stitching and the front central stitching increases, and the opening angle spanned by the left-hand rear stitching and the right-hand rear stitching decreases.

24. An automotive rear loader construction machine, comprising:
   a machine frame having a working direction and including a front side, a rear side, a left-hand longitudinal side and a right-hand longitudinal side;
   a transport conveyor extending in the working direction from the rear side of the machine frame;
   front and rear running gears;
   a working tool connected to the machine frame for removing ground material from a ground surface;
   a plurality of lifting devices, each lifting device supporting the machine frame from one of the running gears, so that each lifting device can be retracted and extended to raise or lower the respective running gear in relation to the machine frame so that a height and an incline of the machine frame in relation to the ground surface can be changed;
   a sensor system configured to detect at least one of the height and the incline of the machine frame in relation to the ground surface;
   a camera system including a plurality of cameras arranged to record overlapping individual image regions of surroundings of the construction machine from different image recording positions relative to the machine frame, wherein the plurality of cameras includes
      a left-hand rear camera and a right-hand rear camera located to the left and right, respectively, from the transport conveyor and facing substantially rearward so that two rear image regions that overlap are recorded;
      a left-hand camera facing to the left from left-hand longitudinal side so that a left-hand image region is recorded;
      a right-hand camera facing to the right from the right-hand longitudinal side so that a right-hand image region is recorded; and
      a front camera facing forward from the front side so that a front image region is recorded;
   an image processing system operably associated with the sensor system and configured such that image details of the overlapping individual image regions are joined together to form a total image from a bird's eye view, and the image processing system being further configured such that a course of stitching between the image details is determined depending on at least one of the height and the incline of the machine frame in relation to the ground surface; and
   a display unit configured to display the total image.

25. The construction machine of claim 24, wherein:
   the machine frame includes a left-hand front corner region, a right-hand front corner region, a left-hand rear corner region and a right-hand rear corner region;
   the left-hand rear camera is arranged in the left-hand rear corner region of the machine frame;
   the right-hand rear camera is arranged in the right-hand rear corner region of the machine frame;
   the left-hand camera is arranged centrally between the left-hand front and left-hand rear corner regions of the machine frame;
   the right-hand camera is arranged centrally between the right-hand front and right-hand rear corner regions of the machine frame; and
   the front camera is arranged centrally between the left-hand front and right-hand front corner regions of the machine frame.

26. The construction machine of claim 25, wherein the image processing system is further configured such that the course of stitching is determined such that:
   a left-hand rear image detail and a right-hand rear image detail are defined, the left-hand rear image detail being laterally limited by a left-hand rear stitching extending from the left-hand rear corner region and by a rear central stitching extending from the rear side, and the right-hand rear image detail being laterally limited by a right-hand rear stitching extending from the right-hand rear corner region and by the rear central stitching;

a left-hand lateral image detail and a right-hand lateral image detail are defined, the left-hand lateral image detail being laterally limited by a left-hand front stitching extending from the left-hand front corner region and by the left-hand rear stitching, and the right-hand lateral image detail being laterally limited by a right-hand front stitching extending from the right-hand front corner region and by the right rear stitching; and a front image detail being laterally limited by the left-hand front stitching and by the right-hand front stitching.

27. The construction machine of claim 26, wherein the image processing system is further configured such that:

with an increasing transverse incline of the machine frame from a parallel orientation to the ground surface to the left-hand side, the course of stitching is determined such that an opening angle spanned by the left-hand front stitching and the left-hand rear stitching decreases and an opening angle spanned by the right-hand front stitching and the right-hand rear stitching increases; and with an increasing transverse incline of the machine frame to the right-hand side, the course of stitching is determined such that the opening angle spanned by the right-hand front stitching and the right-hand rear stitching decreases and the opening angle spanned by the left-hand front stitching and the left-hand rear stitching increases.

28. The construction machine of claim 26, wherein the image processing system is further configured such that:

with an increasing longitudinal incline of the machine frame from a parallel orientation to the ground surface rearward, the course of stitching is determined such that an opening angle spanned by the left-hand rear stitching and the rear central stitching decreases, an opening angle spanned by the right-hand rear stitching and the rear central stitching decreases, and an opening angle spanned by the left-hand front stitching and the right-hand front stitching increases; and with an increasing longitudinal incline of the machine frame from a parallel orientation to the ground surface forward, the course of stitching is determined such that the opening angle spanned by the left-hand rear stitching and the rear central stitching increases, the opening angle spanned by the right-hand rear stitching and the rear central stitching increases, and the opening angle spanned by the left-hand front stitching and the right-hand front stitching decreases.

29. A method of displaying an image of the surroundings of an automotive front loader construction machine, the construction machine including a machine frame, a transport conveyor on a front side, front and rear running gears, a working tool supported from the machine frame for removing ground material from a ground surface, and a plurality of lifting devices, each lifting device supporting the machine frame from one of the running gears so that each lifting device can be retracted and extended to raise or lower the respective running gear in relation to the machine frame so that a height and an incline of the machine frame in relation to the ground surface can be changed, the method comprising:

(a) detecting at least one of the height and the incline of the machine frame in relation to the ground surface;

(b) recording overlapping individual image regions of the construction machine surroundings from different image recording positions using a plurality of cameras supported from the machine frame, wherein the overlapping image regions include:

left and right overlapping front image regions recorded using two front cameras arranged on left and right sides, respectively, of the transport conveyor;

a left-hand image region recorded using a left-hand camera on a left-hand longitudinal side of the construction machine;

a right-hand image region recorded using a right-hand camera on a right-hand longitudinal side of the construction machine; and a rear image region recorded using a rear camera;

(c) joining together image details of the individual image regions to form a total image from a bird's eye view, and determining a course of stitching between the image details depending on at least one of the height and the incline of the machine frame in relation to the ground surface; and (d) displaying the total image.

30. The method of claim 29, wherein in step (c):

the course of stitching includes a left-hand front stitching between the left front image region and the left-hand image region, a left-hand rear stitching between the left-hand image region and the rear image region, a right-hand front stitching between the right front image region and the right-hand image region, a right-hand rear stitching between the right-hand image region and the rear image region, and a front central stitching between the left-hand front stitching and the right-hand front stitching;

with an increasing longitudinal incline of the machine frame from a parallel orientation to the ground surface forward, the course of stitching is determined such that an opening angle spanned by the left-hand front stitching and the front central stitching decreases, an opening angle spanned by the right-hand front stitching and the front central stitching decreases, and an opening angle spanned by the left-hand rear stitching and the right-hand rear stitching increases; and with an increasing longitudinal incline of the machine frame from a parallel orientation to the ground surface rearward, the course of stitching is determined such that the opening angle spanned by the left-hand front stitching and the front central stitching increases, the opening angle spanned by the right-hand front stitching and the front central stitching increases, and the opening angle spanned by the left-hand rear stitching and the right-hand rear stitching decreases.

31. A method of displaying an image of the surroundings of an automotive rear loader construction machine, the construction machine including a machine frame, a transport conveyor on a front side, front and rear running gears, a working tool supported from the machine frame for removing ground material from a ground surface, and a plurality of lifting devices, each lifting device supporting the machine frame from one of the running gears so that each lifting device can be retracted and extended to raise or lower the respective running gear in relation to the machine frame so that a height and an incline of the machine frame in relation to the ground surface can be changed, the method comprising:

(a) detecting at least one of the height and the incline of the machine frame in relation to the ground surface;
(b) recording overlapping individual image regions of the construction machine surroundings from different image recording positions using a plurality of cameras supported from the machine frame, wherein the overlapping image regions include:
   left and right overlapping rear image regions recorded using two rear cameras arranged on left and right sides, respectively, of the transport conveyor;
   a left-hand image region recorded using a left-hand camera on a left-hand longitudinal side of the construction machine;
   a right-hand image region recorded using a right-hand camera on a right-hand longitudinal side of the construction machine; and
   a front image region recorded using a front camera;
(c) joining together image details of the individual image regions to form a total image from a bird's eye view, and determining a course of stitching between the image details depending on at least one of the height and the incline of the machine frame in relation to the ground surface; and
(d) displaying the total image.

32. The method of claim 31, wherein in step (c):
the course of stitching includes a left-hand rear stitching between the left rear image region and the left-hand image region, a left-hand front stitching between the left-hand image region and the front image region, a right-hand rear stitching between the right rear image region and the right-hand image region, and a right-hand front stitching between the right-hand image region and the front image region;
with an increasing transverse incline of the machine frame from a parallel orientation to the ground surface to the left-hand longitudinal side, the course of stitching is determined such that an opening angle spanned by the left-hand rear stitching and the left-hand front stitching decreases and an opening angle spanned by the right-hand rear stitching and the right-hand front stitching increases; and
with an increasing transverse incline of the machine frame to the right-hand longitudinal side, the course of stitching is determined such that the opening angle spanned by the right-hand rear stitching and the right-hand front stitching decreases and the opening angle spanned by the left-hand rear stitching and the left-hand front stitching increases.

33. The method of claim 31, wherein in step (c):
the course of stitching includes a left-hand rear stitching between the left rear image region and the left-hand image region, a left-hand front stitching between the left-hand image region and the front image region, a right-hand rear stitching between the right rear image region and the right-hand image region, a right-hand front stitching between the right-hand image region and the front image region, and a rear central stitching between the left-hand rear stitching and the right-hand rear stitching;
with an increasing longitudinal incline of the machine frame from a parallel orientation to the ground surface rearward, the course of stitching is determined such that an opening angle spanned by the left-hand rear stitching and the rear central stitching decreases, an opening angle spanned by the right-hand rear stitching and the rear central stitching decreases, and an opening angle spanned by the left-hand front stitching and the right-hand front stitching increases; and
with an increasing longitudinal incline of the machine frame from a parallel orientation to the ground surface forward, the course of stitching is determined such that the opening angle spanned by the left-hand rear stitching and the rear central stitching increases, the opening angle spanned by the right-hand rear stitching and the rear central stitching increases, and the opening angle spanned by the left-hand front stitching and the right-hand front stitching decreases.

* * * * *